United States Patent
Liou et al.

(10) Patent No.: US 10,841,914 B2
(45) Date of Patent: Nov. 17, 2020

(54) METHOD AND APPARATUS FOR CHANNEL USAGE IN UNLICENSED SPECTRUM CONSIDERING BEAMFORMED TRANSMISSION IN A WIRELESS COMMUNICATION SYSTEM

(71) Applicant: ASUSTek Computer Inc., Taipei (TW)

(72) Inventors: Jia-Hong Liou, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/124,860

(22) Filed: Sep. 7, 2018

(65) Prior Publication Data

US 2019/0082426 A1    Mar. 14, 2019

Related U.S. Application Data

(60) Provisional application No. 62/555,898, filed on Sep. 8, 2017.

(51) Int. Cl.
*H04W 72/04* (2009.01)
*H04W 16/14* (2009.01)
(Continued)

(52) U.S. Cl.
CPC ........... *H04W 72/042* (2013.01); *H04B 7/02* (2013.01); *H04L 5/0094* (2013.01); *H04W 16/14* (2013.01);
(Continued)

(58) Field of Classification Search
CPC ........... H04W 72/042; H04W 72/0446; H04W 16/14; H04B 7/02; H04L 5/0094; H04L 5/005
See application file for complete search history.

(56) References Cited

U.S. PATENT DOCUMENTS

2013/0195031 A1* 8/2013 Hessler ............... H04L 1/1819
370/329
2015/0365921 A1   12/2015 Wu
(Continued)

FOREIGN PATENT DOCUMENTS

CN   106028452   10/2016
EP     3171654    5/2017
(Continued)

OTHER PUBLICATIONS

European Search Report from corresponding EP Application No. 18193172,6, dated Feb. 11, 2019.
(Continued)

*Primary Examiner* — Marcus Hammonds
(74) *Attorney, Agent, or Firm* — Cooper Legal Group, LLC

(57) ABSTRACT

A method and apparatus are disclosed from the perspective of a UE (User Equipment). In one embodiment, the method includes the UE monitors or receives a control signal within a channel occupancy, wherein the control signal indicates a number of consecutive TTIs (Transmission Time Intervals) and TTI format(s) related information of the TTIs. The method further includes the UE derives transmission direction of symbols in the TTIs or functionality of symbols in the TTIs from the information. The method also includes the UE considers the last TTI of the indicated TTIs as an ending TTI of the channel occupancy. In addition, the method includes the UE performs DL (Downlink) data reception or UL (Uplink) data transmission until the ending TTI.

18 Claims, 26 Drawing Sheets

(51) Int. Cl.
*H04B 7/02* (2018.01)
*H04L 5/00* (2006.01)
(52) U.S. Cl.
CPC ......... *H04W 72/0446* (2013.01); *H04L 5/005* (2013.01)

(56) References Cited

U.S. PATENT DOCUMENTS

| | | | |
|---|---|---|---|
| 2016/0142920 A1* | 5/2016 | Suzuki | H04W 16/14 370/336 |
| 2017/0142751 A1 | 5/2017 | Liu et al. | |
| 2017/0250781 A1 | 8/2017 | Golitschek Edler Von Elbwart et al. | |
| 2017/0302410 A1 | 10/2017 | Liu et al. | |
| 2018/0132260 A1 | 5/2018 | Harada et al. | |

FOREIGN PATENT DOCUMENTS

| | | |
|---|---|---|
| TW | 201728207 | 8/2017 |
| WO | 2016073039 | 5/2016 |
| WO | WO2016073039 A1 | 5/2016 |
| WO | 2016105127 | 6/2016 |
| WO | WO20160105127 | 6/2016 |
| WO | 2017026399 | 2/2017 |
| WO | 2017078796 | 5/2017 |
| WO | 2018030379 | 2/2018 |

OTHER PUBLICATIONS

Office Action from Taiwan Patent Office in corresponding TW Application No. 107131623, dated Jun. 17, 2019.
3GPP TSG RAN WG1 Meeting#90, R1-1714416, "On UE Procedures Related to Group-Common PDCCH", Prague, Czech Republic, Aug. 21-25, 2017.
3GPP TSG RAN WG1 Meeting#90, R1-1713186, "Discussion on time-domain resource allocation", Prague, Czech Republic, Aug. 21-25, 2017.
3GPP TSG RAN WG1 Meeting#89, R1-1707825, "Discussion on group-common PDCCH", Hangzhou, P.R. China May 15-19, 2017.
Office Action from Japan Patent office in corresponding JP Application No. 2018-167423, dated Jul. 2, 2019.
Office Action from TIPO in corresponding TIPO Application No. 107131623, dated Jan. 10, 2020.
Office Action from Korean Intellectual Property Office in corresponding KR Application No. 10-2018-0106956, dated Mar. 5, 2020.
Office Action from TIPO in corresponding CN Application No. 201811044613, dated Mar. 17, 2020.
Office Action from Intellectual Property of India in corresponding IN Application No. 201814033664, dated May 27, 2020.

* cited by examiner (a) Digital beamforming (b) Analogue beamforming

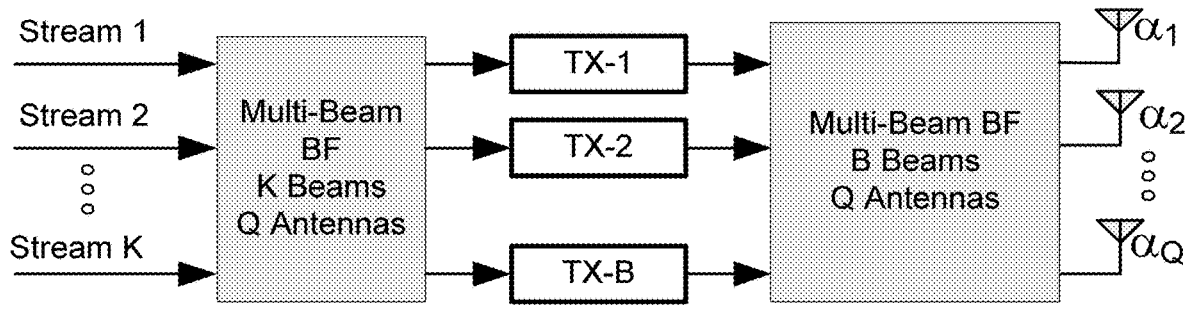
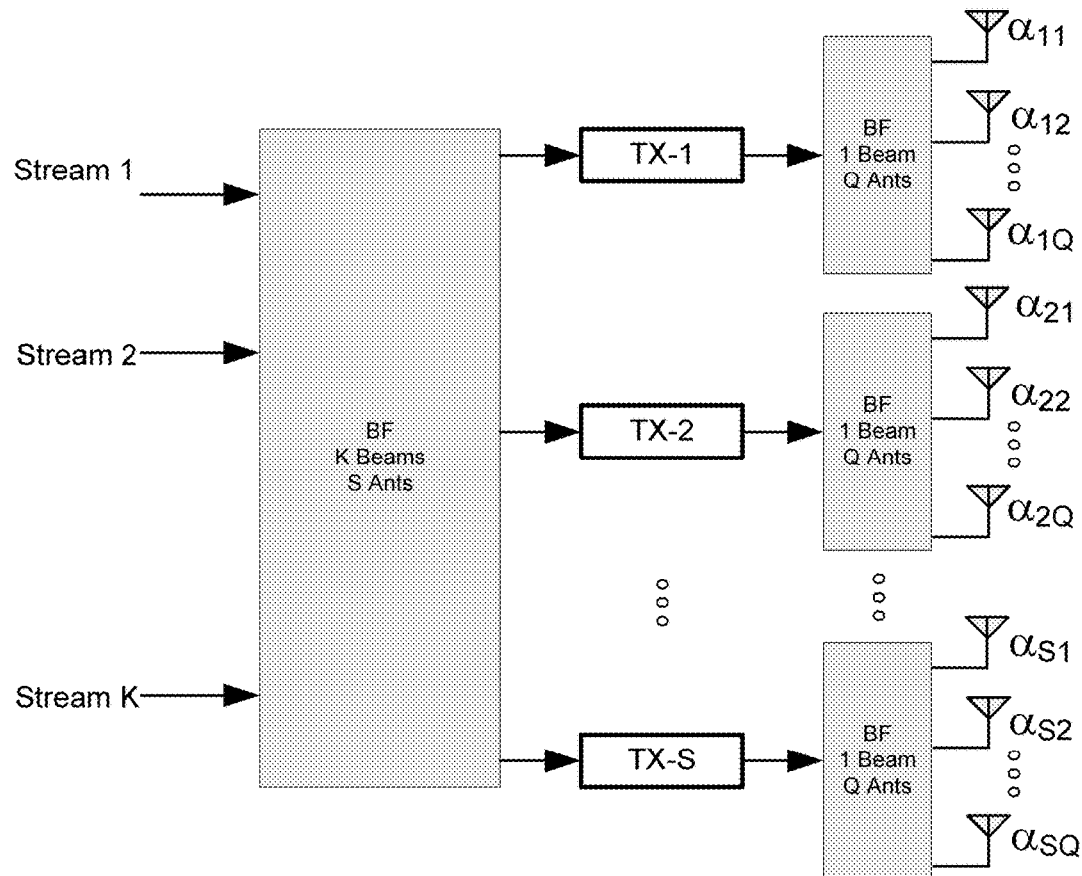
(c) Hybrid beamforming: Left = fully connected, Right = sub-array
FIG. 5C

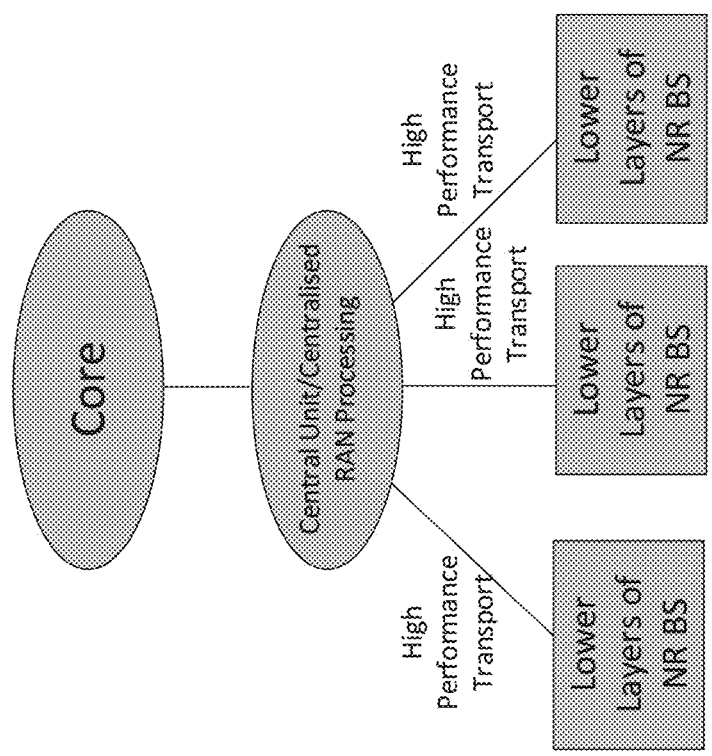
FIG. 7 CONTINUED (PRIOR ART)

| Value of 'Subframe configuration for LAA' field in current subframe | Configuration of occupied OFDM symbols (current subframe, next subframe) |
|---|---|
| 0000 | (-,14) |
| 0001 | (-,12) |
| 0010 | (-,11) |
| 0011 | (-,10) |
| 0100 | (-,9) |
| 0101 | (-,6) |
| 0110 | (-,3) |
| 0111 | (14,*) |
| 1000 | (12,-) |
| 1001 | (11,-) |
| 1010 | (10,-) |
| 1011 | (9,-) |
| 1100 | (6,-) |
| 1101 | (3,-) |
| 1110 | reserved |
| 1111 | reserved |

NOTE:
- (-, Y) means UE may assume the first Y symbols are occupied in next subframe and other symbols in the next subframe are not occupied.

- (X,-) means UE may assume the first X symbols are occupied in current subframe and other symbols in the current subframe are not occupied.

- (X,*) means UE may assume the first X symbols are occupied in current subframe, and at least the first OFDM symbol of the next subframe is not occupied.

FIG. 13 (PRIOR ART)

| Value of 'UL duration and offset' field | UL offset, $l$ (in subframes) | UL duration, $d$ (in subframes) |
|---|---|---|
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

FIG. 14 (PRIOR ART)

| Channel Access Priority Class ($p$) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 63 | 8 or 10 ms | {15,31,63} |
| 4 | 7 | 15 | 1023 | 8 or 10 ms | {15,31,63,127,255,511,1023} |

FIG. 15 (PRIOR ART)

| Channel Access Priority Class ($p$) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 1023 | 6ms or 10 ms | {15,31,63,127,255,511,1023} |
| 4 | 7 | 15 | 1023 | 6ms or 10 ms | {15,31,63,127,255,511,1023} |

NOTE1: For $p=3,4$, $T_{ulmcot,p} = 10$ms if the higher layer parameter '*absenceOfAnyOtherTechnology-r14*' indicates TRUE, otherwise, $T_{ulmcot,p} = 6$ms.

NOTE 2: When $T_{ulmcot,p} = 6$ms it may be increased to 8 ms by inserting one or more gaps. The minimum duration of a gap shall be 100 μs. The maximum duration before including any such gap shall be 6 ms..

FIG. 16 (PRIOR ART)

| Value | PUSCH starting position |
|---|---|
| 00 | symbol 0 |
| 01 | 25μs in symbol 0 |
| 10 | (25+TA) μs in symbol 0 |
| 11 | symbol 1 |

METHOD AND APPARATUS FOR CHANNEL USAGE IN UNLICENSED SPECTRUM CONSIDERING BEAMFORMED TRANSMISSION IN A WIRELESS COMMUNICATION SYSTEM

CROSS-REFERENCE TO RELATED APPLICATIONS

The present Application claims the benefit of U.S. Provisional Patent Application Ser. No. 62/555,898 filed on Sep. 8, 2017, the entire disclosure of which is incorporated herein in its entirety by reference.

FIELD

This disclosure generally relates to wireless communication networks, and more particularly, to a method and apparatus for channel usage in unlicensed spectrum considering beamformed transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes the UE monitors or receives a control signal within a channel occupancy, wherein the control signal indicates a number of consecutive TTIs (Transmission Time Intervals) and TTI format(s) related information of the TTIs. The method further includes the UE derives transmission direction of symbols in the TTIs or functionality of symbols in the TTIs from the information. The method also includes the UE considers the last TTI of the indicated TTIs as an ending TTI of the channel occupancy. In addition, the method includes the UE performs DL (Downlink) data reception or UL (Uplink) data transmission until the ending TTI.

BRIEF DESCRIPTION OF THE DRAWINGS

FIGS. 5A-5C provide exemplary illustrations of three types of beamforming.

FIG. 8 is a reproduction of FIG. 3 of 3GPP R2-162210.

FIG. 13 is a reproduction of Table 13A-1 of 3GPP TS 36.213 V14.3.0.

FIG. 14 is a reproduction of Table 13A-2 of 3GPP TS 36.213 V14.3.0.

FIG. 15 is a reproduction of Table 15.1.1-1 of 3GPP TS 36.213 V14.3.0.

FIG. 16 is a reproduction of Table 15.2.1-1 of 3GPP TS 36.213 V14.3.0.

FIG. 17 is a reproduction of Table 5.3.3.1.1A-1 of 3GPP TS 36.212 V14.3.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3 Generation Partnership Project" referred to herein as 3GPP, including: R2-162366, "Beam Forming Impacts", Nokia and Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; R3-160947, TR 38.801 V0.1.0, "Study on New Radio Access Technology; Radio Access Architecture and Interfaces"; R2-164306, "Summary of email discussion [93bis #23][NR] Deployment scenarios", NTT DOCOMO, INC.; 3GPP RAN2#94 meeting minute; R2-162251, "RAN2 aspects of high frequency New RAT", Samsung; TS 36.213 V14.3.0, "E-UTRA Physical layer procedures"; TS 36.212 V14.3.0, "E-UTRA Multiplexing and channel coding"; TS 36.211 V14.3.0, "E-UTRA Physical channels and modulation"; Final Report of 3GPP TSG RAN WG1 #85 v1.0.0 (Nanjing, China, 23-27 May 2016); Final Report of 3GPP TSG RAN WG1 #86 v1.0.0 (Gothenburg, Sweden, 22-26 Aug. 2016); Final Report of 3GPP TSG RAN WG1 #86bis v1.0.0 (Lisbon, Portugal, 10-14 Oct. 2016); Final Report of 3GPP TSG RAN WG1 #87 v1.0.0 (Reno, USA, 14-18 Nov. 2016); Final Report of 3GPP TSG RAN WG1 # AH1_NR v1.0.0 (Spokane, USA, 16-20 Jan. 2017); Final Report of 3GPP TSG RAN WG1 #88 v1.0.0 (Athens, Greece, 13-17 Feb. 2017); Final Report of 3GPP TSG RAN WG1 #88bis v1.0.0 (Spokane, USA, 3-7 Apr. 2017); Final Report of 3GPP TSG RAN WG1 #89 v1.0.0 (Hangzhou, China, 15-19 May 2017); Final Report of 3GPP TSG RAN WG1 # AH_NR2 v1.0.0 (Qingdao, China, 27-30 Jun. 2017); and Final Chairman's Note of 3GPP TSG RAN WG1 Meeting #90 (Prague, Czech Republic, 21-25 Aug. 2017). The standards and documents listed above are hereby expressly incorporated by reference in their entirety.

Figure 1:
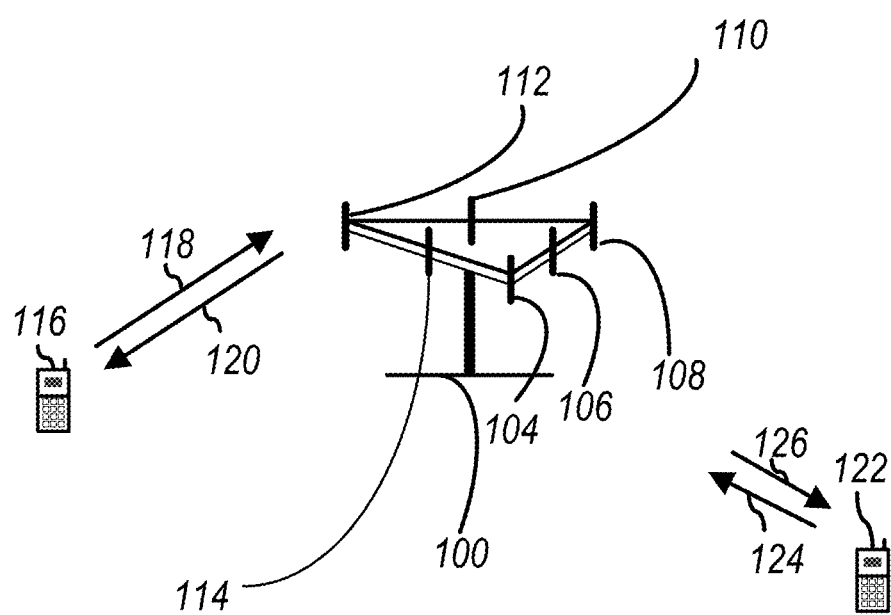
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
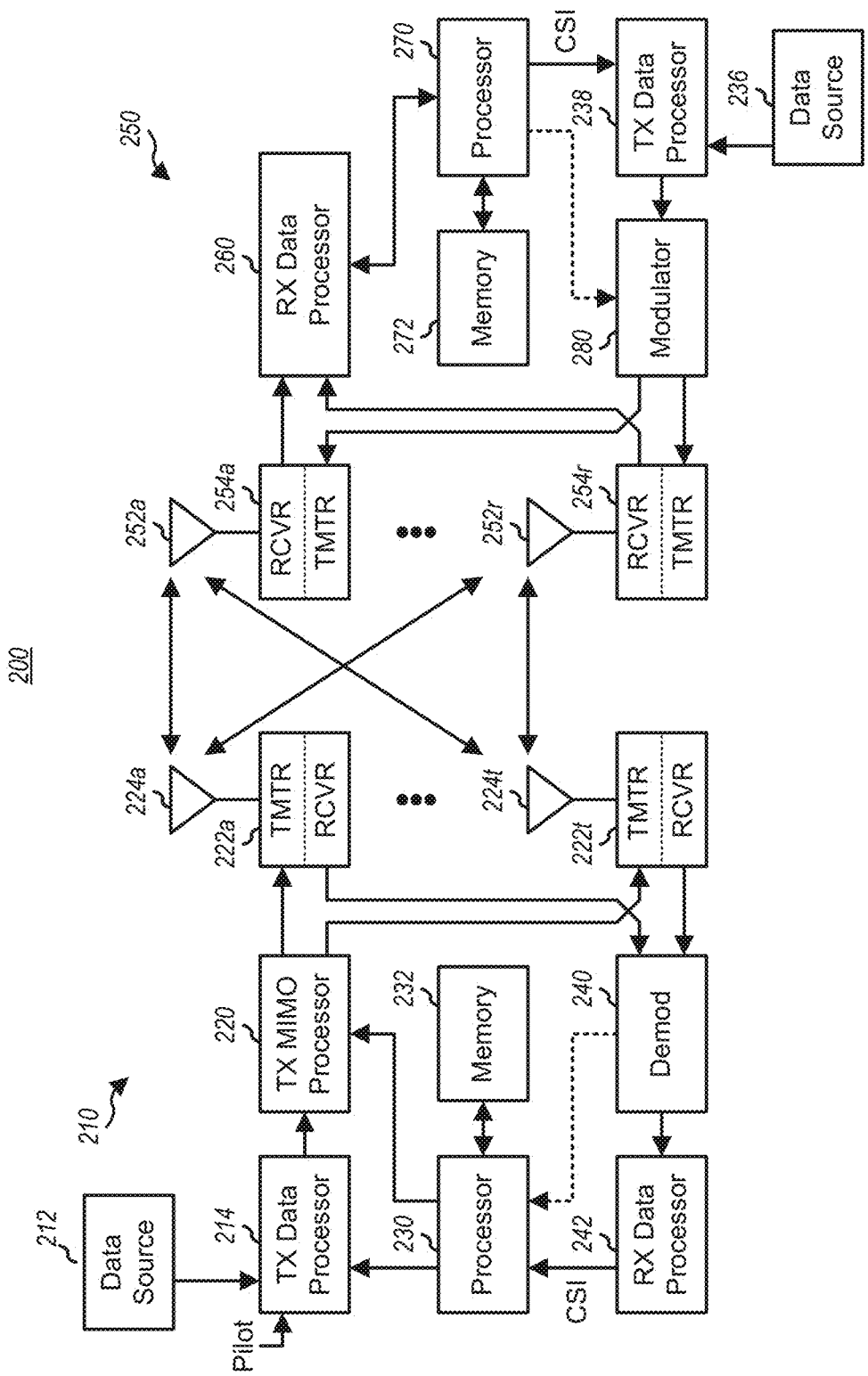
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
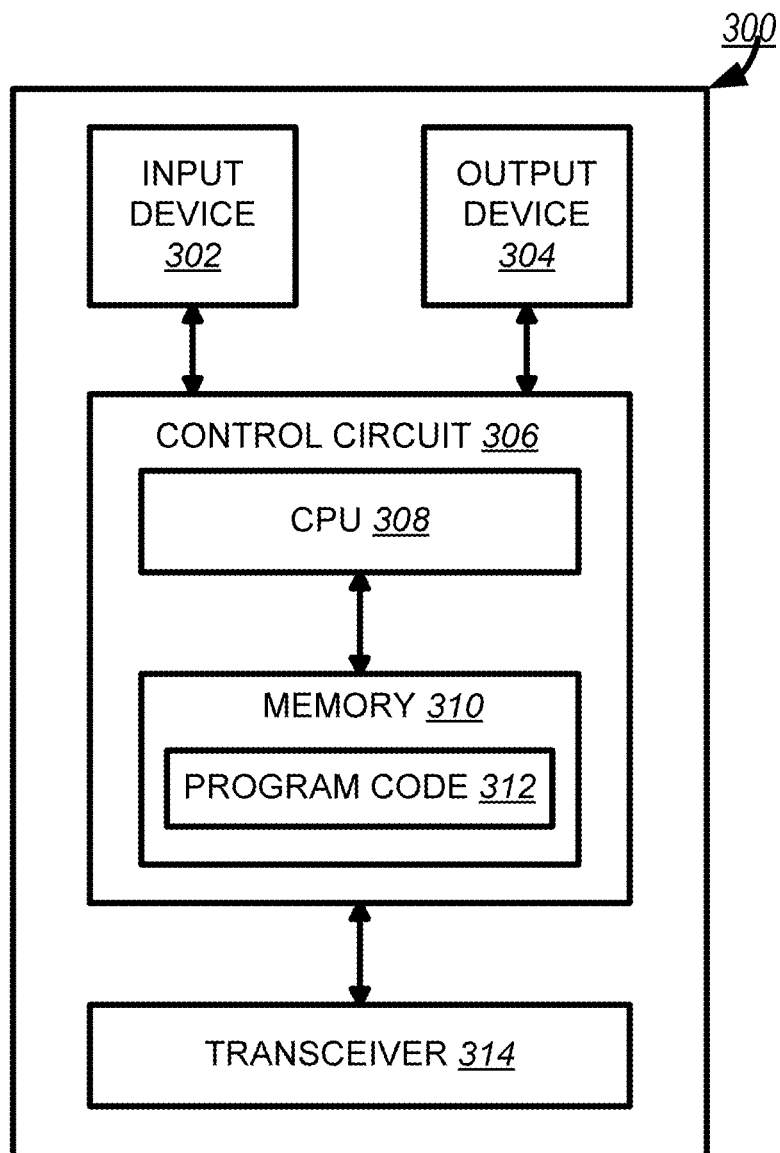
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
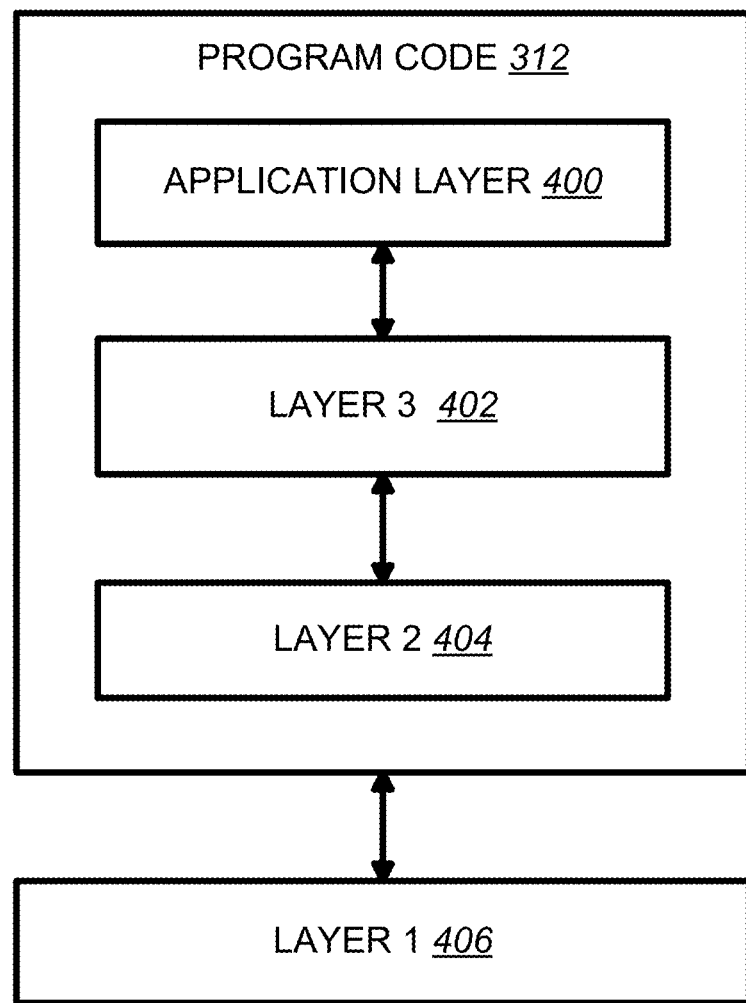
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. In general, the next generation access technology aims to support the following three families of usage scenarios for satisfying both the urgent market needs and the more long-term requirements set forth by the ITU-R IMT-2020:
eMBB (enhanced Mobile Broadband)
mMTC (massive Machine Type Communications)
URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Based on 3GPP R2-162366, in lower frequency bands (e.g., current LTE bands<6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence the high gain beams being narrow compared to a wide sector beam, multiple beams for transmitting downlink common channels are needed to cover the required cell area. The number of concurrent high gain beams that access point is able to form may be limited by the cost and complexity of the utilized transceiver architecture. In practice, in higher frequencies, the number of concurrent high gain beams is much less than the total number of beams required to cover the cell area. In other words, the access point is able to cover only part of the cell area by using a subset of beams at any given time.

Based on 3GPP R2-163716, beamforming is a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Beamforming can be generally categorized into three types of implementation: digital beamforming, hybrid beamforming, and analog beamforming. For digital beamforming, the beam is generated on the digital domain, i.e. the weighting of each antenna element can be controlled by baseband (e.g. connected to a TXRU (Transceiver Units)). Therefore it is very easy to tune the beam direction of each subband differently across the system bandwidth. Also, to change beam direction from time to time does not require any switching time between OFDM (Orthogonal Frequency Division Multiplexing) symbols. All beams whose directions cover the whole coverage can be generated simultaneously. However, this structure requires (almost) one-to-one mapping between TXRU (transceiver/RF chain) and antenna element and is quite complicated as the number of antenna element increases and system bandwidth increases (also heat problem exists).

For Analog beamforming, the beam is generated on the analog domain, i.e. the weighting of each antenna element can be controlled by an amplitude/phase shifter in the RF (Radio Frequency) circuit. Since the weighing is purely controlled by the circuit, the same beam direction would apply on the whole system bandwidth. Also, if beam direction is to be changed, switching time is required. The number of beams generated simultaneous by an analog beamforming depends on the number of TXRU. Note that for a given size of array, the increase of TXRU may decrease the antenna element of each beam, such that wider beam would be generated. In short, analog beamforming could avoid the complexity and heat problem of digital beamforming, while is more restricted in operation. Hybrid beamforming can be considered as a compromise between analog and digital beamforming, where the beam can come from both analog and digital domain.

Figure 5A:
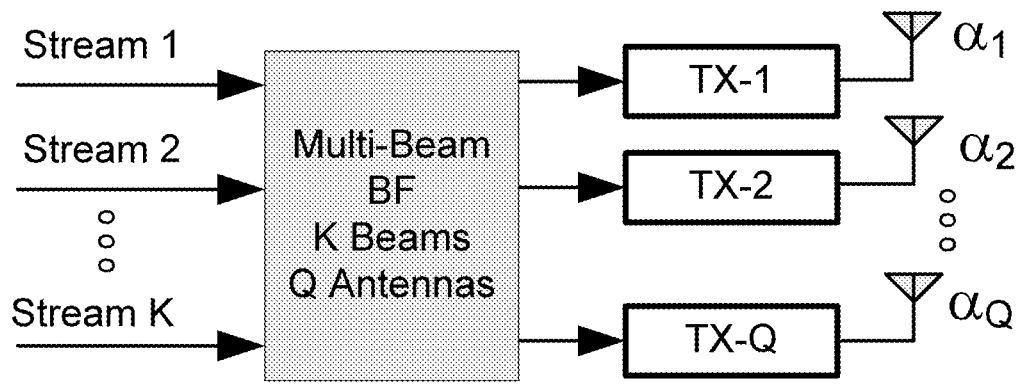
Figure 5B:
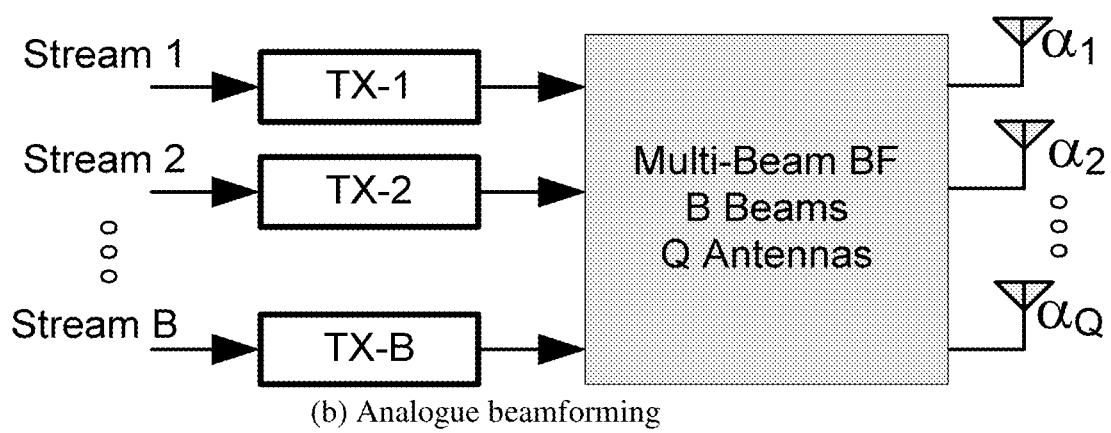

FIGS. 5A-5C provide exemplary illustrations of the three types of beamforming.

Figure 6:
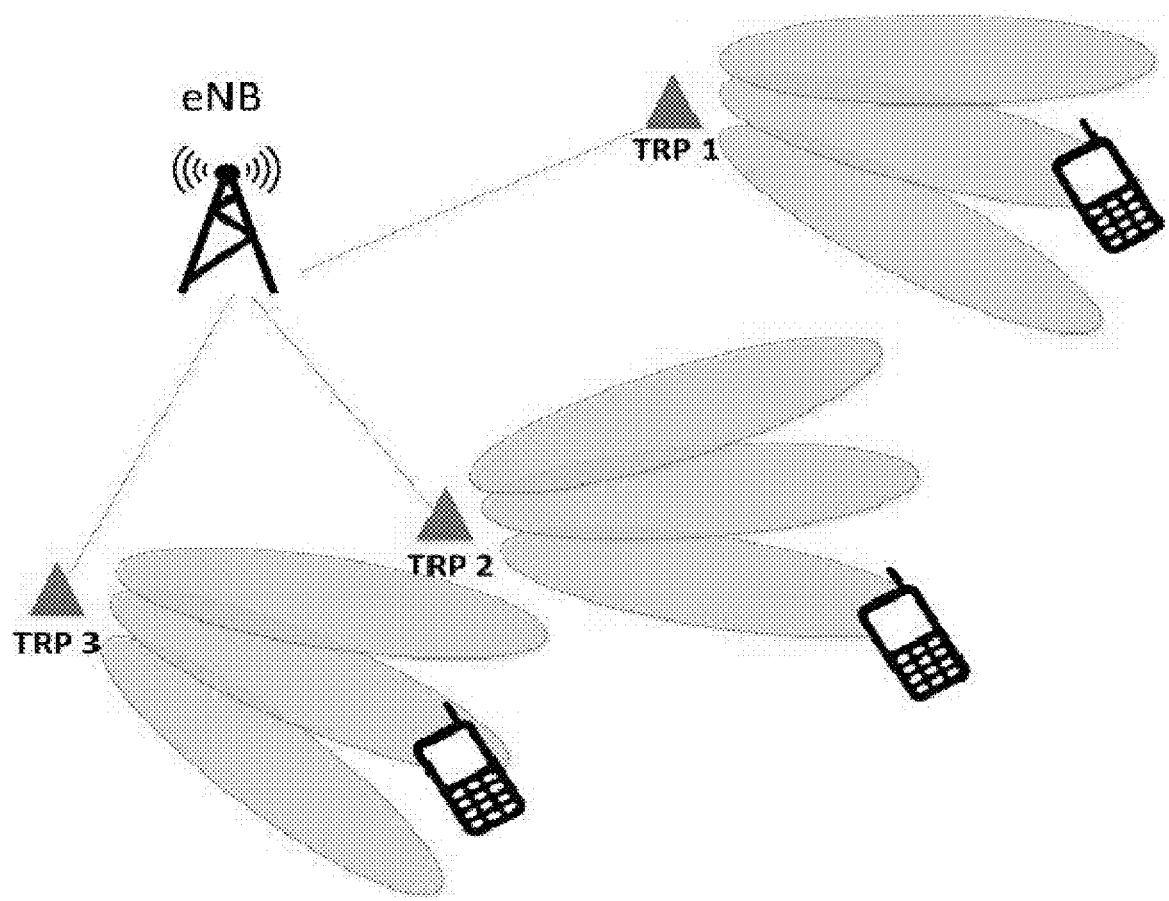
FIG. 6 is a reproduction of FIG. 1 of 3GPP R2-162709.

Based on 3GPP R2-162709 and as shown in FIG. 6, an eNB may have multiple TRPs (either centralized or distributed). Each TRP (Transmission/Reception Point) can form multiple beams. The number of beams and the number of simultaneous beams in the time/frequency domain depend on the number of antenna array elements and the RF (Radio Frequency) at the TRP.

Potential mobility type for NR can be listed as follows:
Intra-TRP mobility
Inter-TRP mobility
Inter-NR eNB mobility Based on 3GPP R2-162762, reliability of a system purely relying on beamforming and operating in higher frequencies might be challenging, since the coverage might be more sensitive to both time and space variations. As a consequence of that the SINR (Signal to Interference Plus Noise Ratio) of that narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

Figure 7:
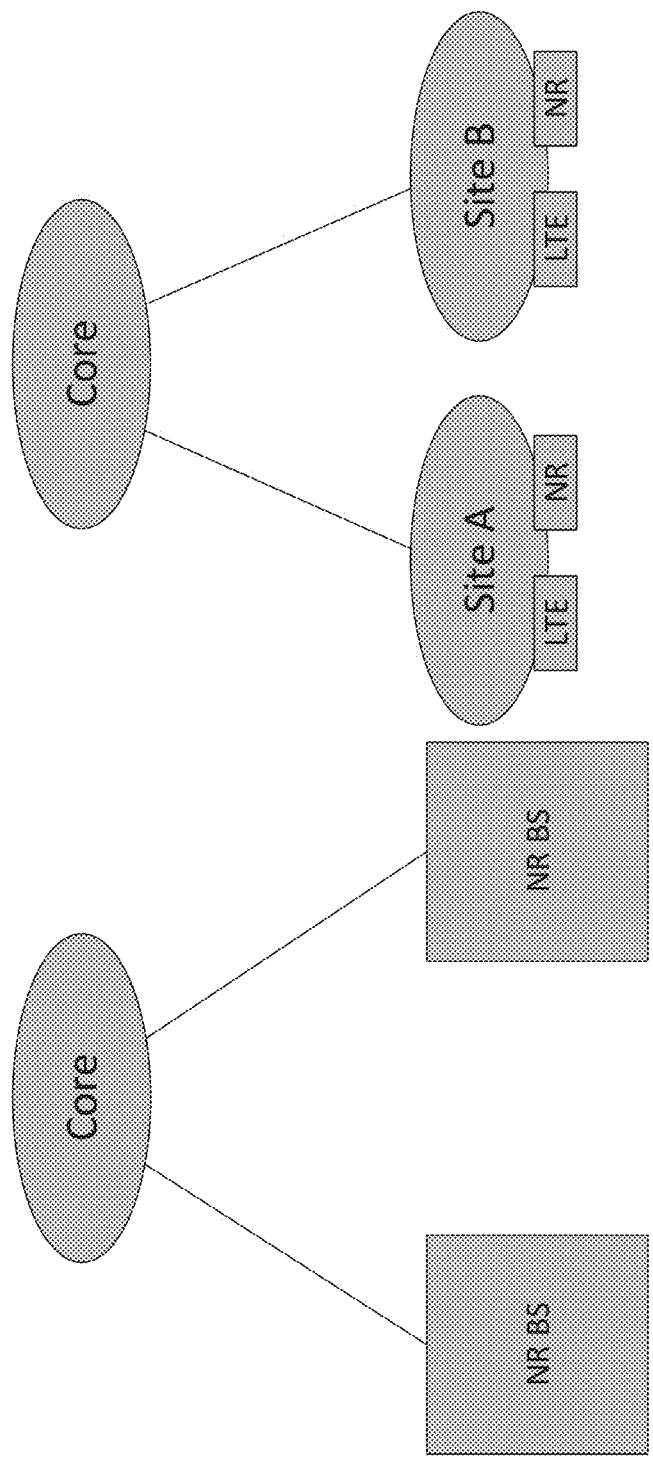
FIGS. 7 and 8 are reproduction of figures of 3GPP R2-160947.
Figure 8:
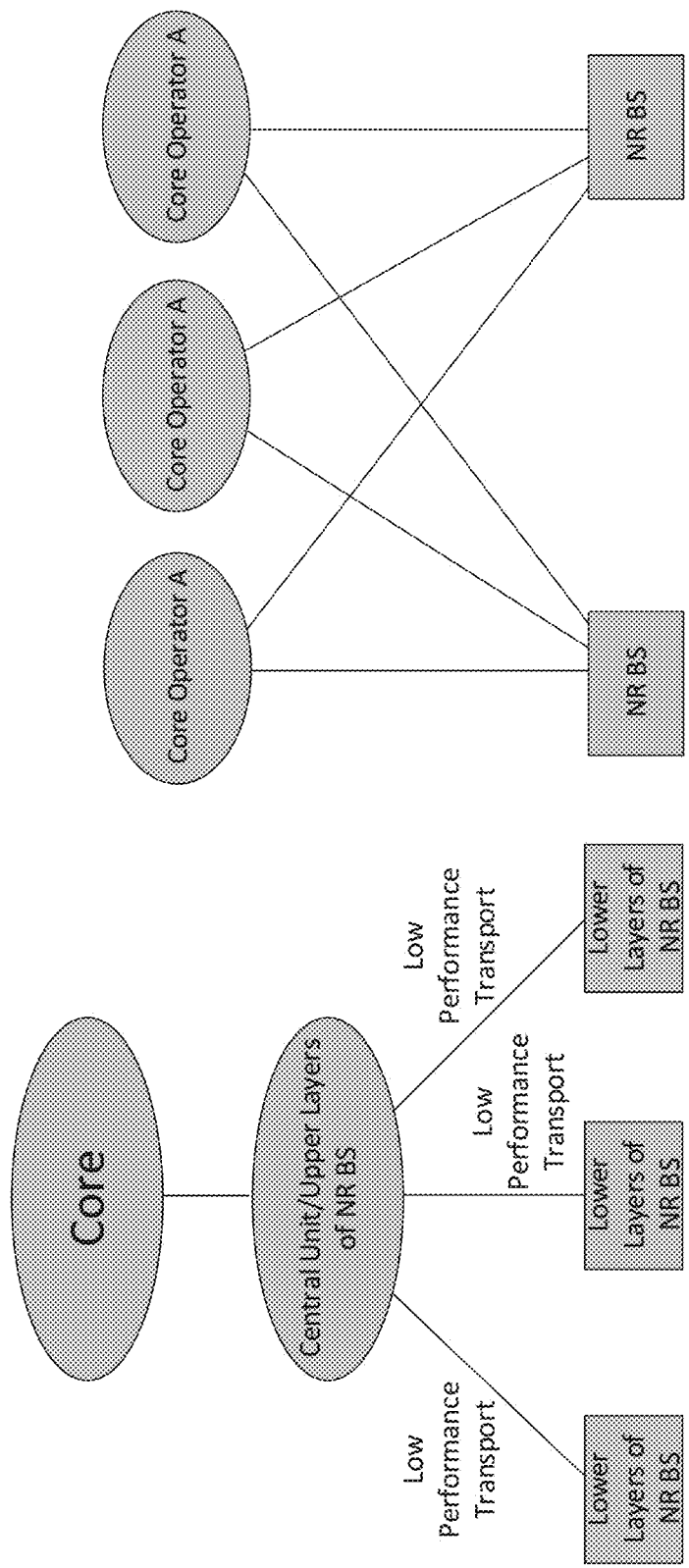

Based on 3GPP R3-160947, the scenarios illustrated in FIGS. 7 and 8 should be considered for support by the NR radio network architecture.

Based on 3GPP R2-164306, the following scenarios in terms of cell layout for standalone NR are captured to be studied:
Macro cell only deployment
Heterogeneous deployment
Small cell only deployment Based on 3GPP RAN2#94 meeting minutes, 1 NR eNB corresponds to 1 or many TRPs. Two levels of network controlled mobility:
RRC driven at "cell" level.
Zero/Minimum RRC involvement (e.g. at MAC/PHY).

Figure 9:
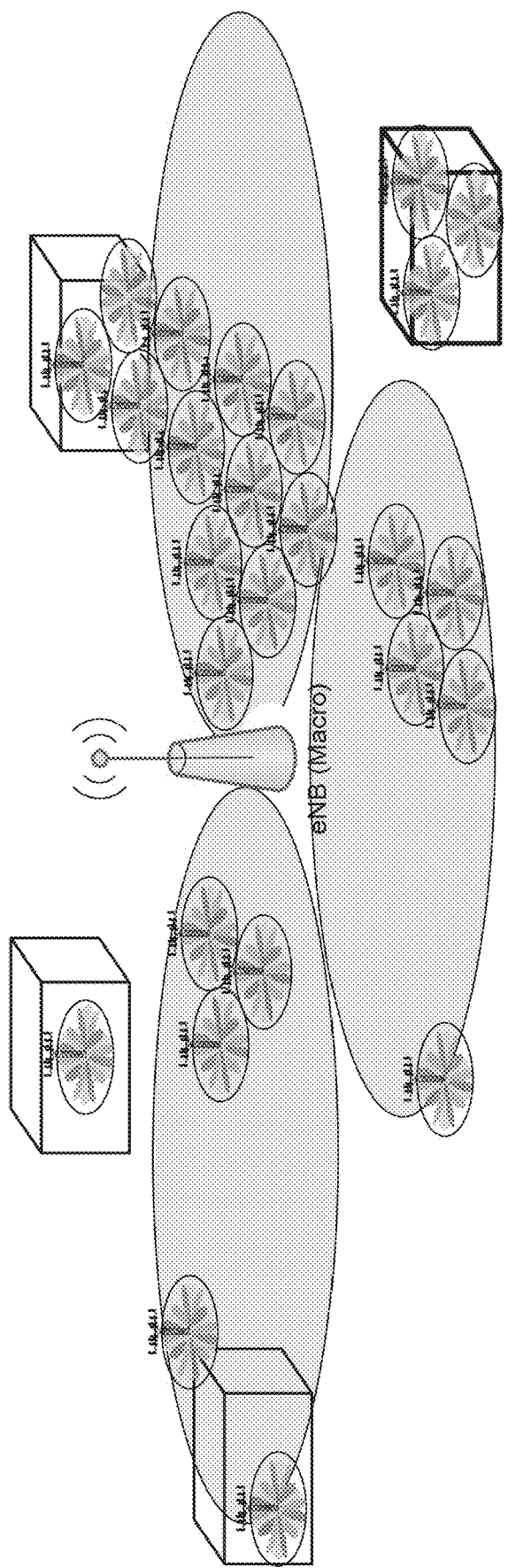
FIG. 9 shows an exemplary deployment with single TRP cell.
Figure 10:
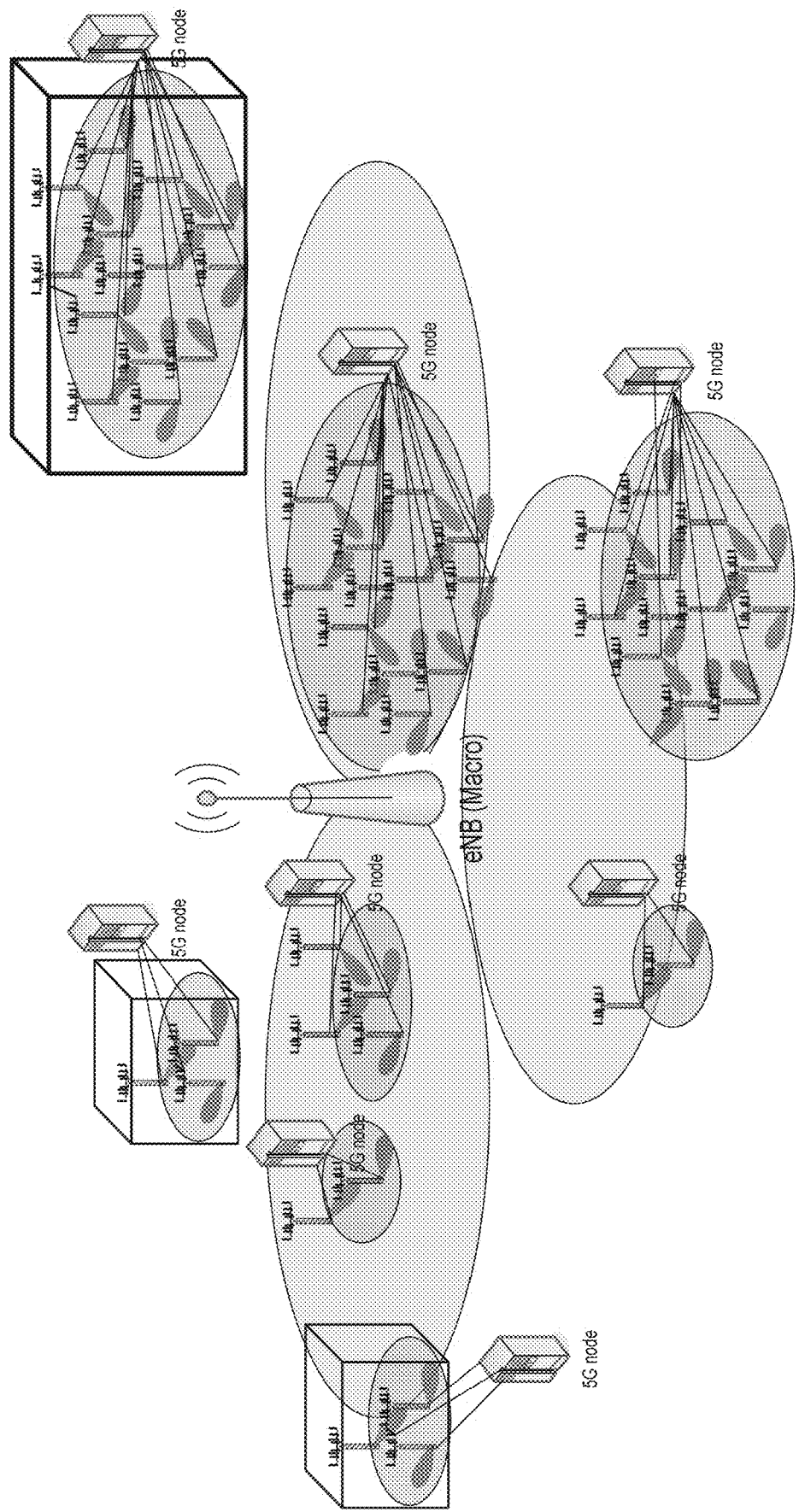
FIG. 10 shows an exemplary deployment with multiple TRP cells.
Figure 11:
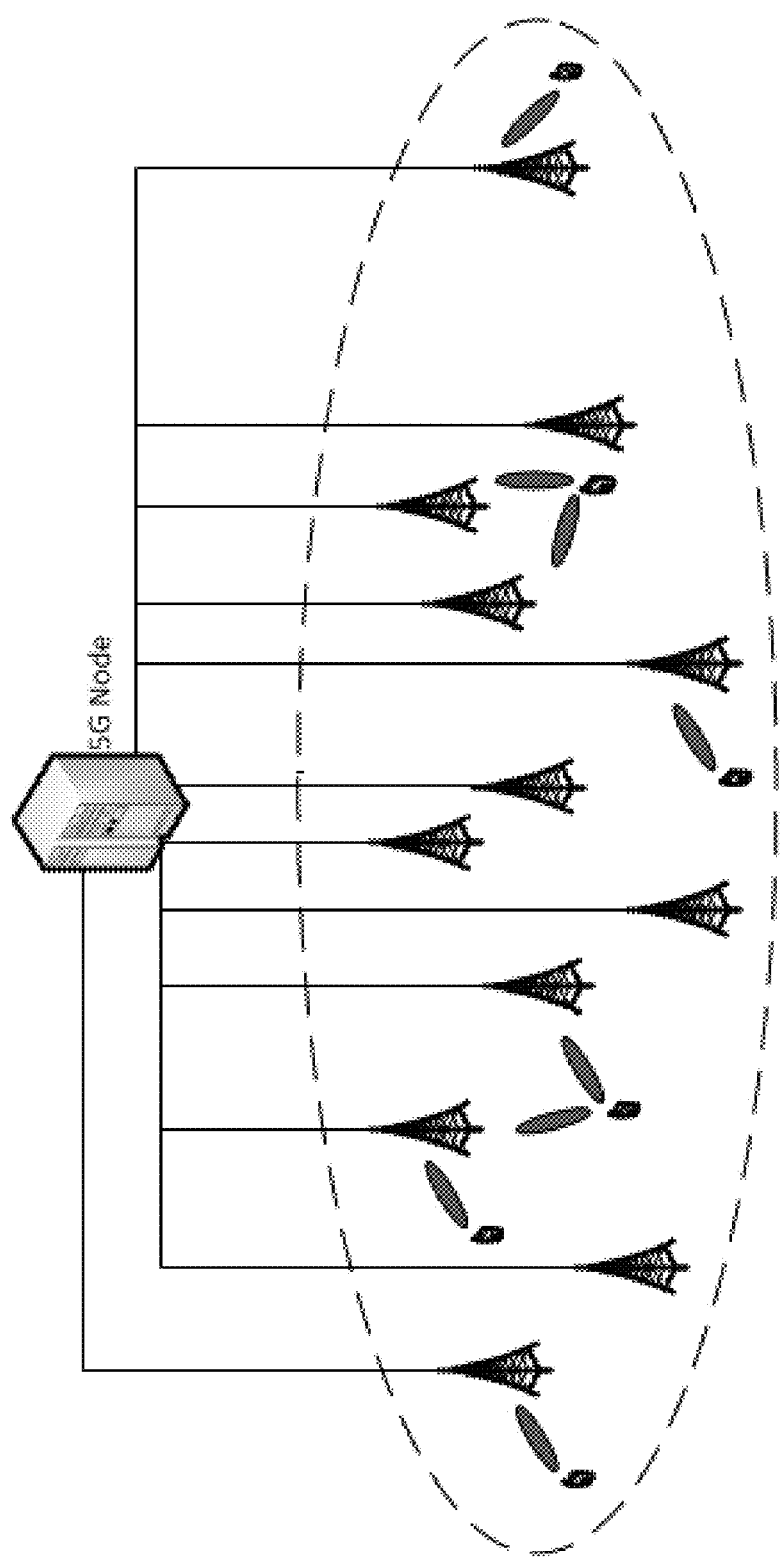
FIG. 11 shows an exemplary 5G cell comprising a 5G node with multiple TRPs.
Figure 12:
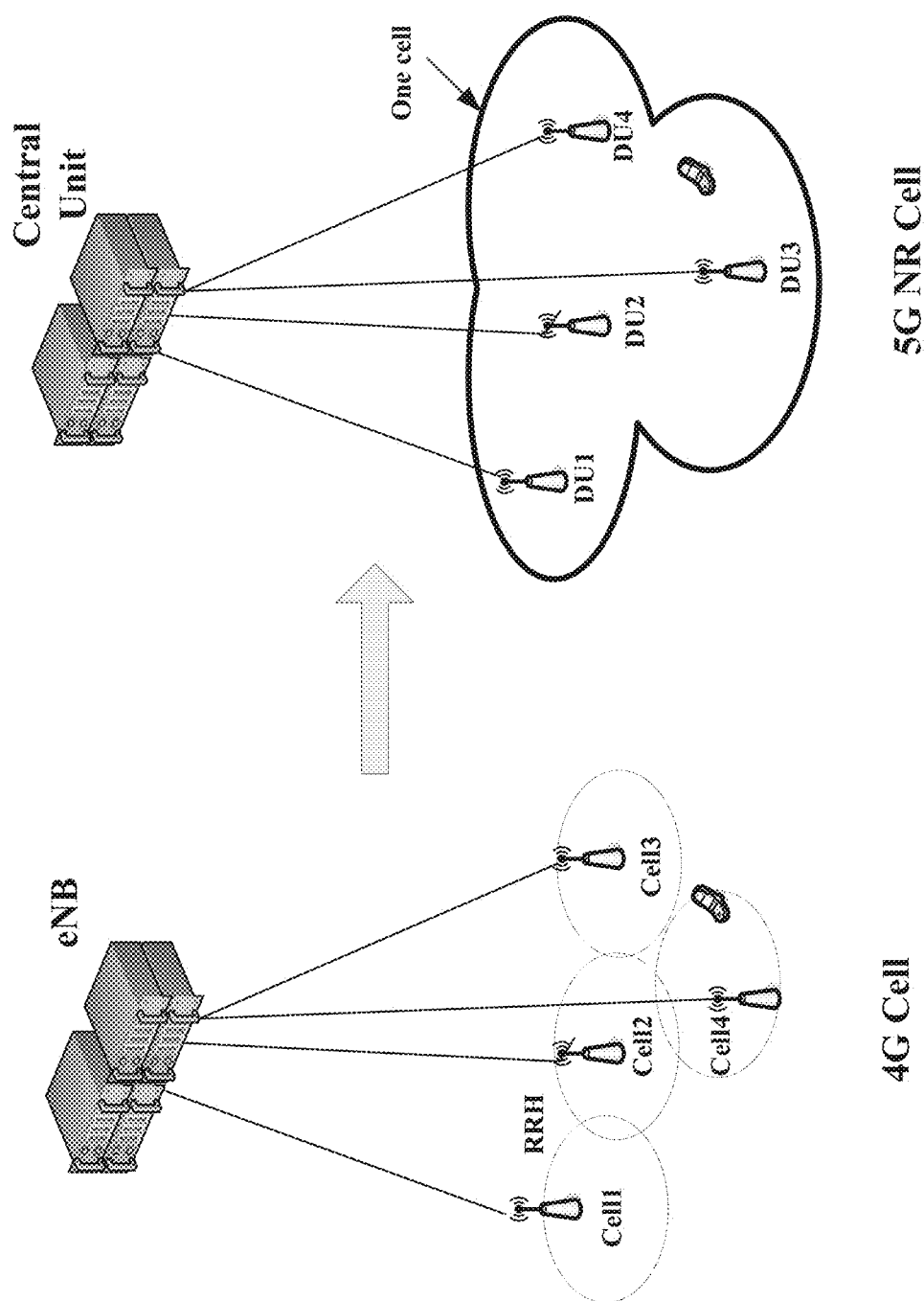
FIG. 12 shows an exemplary comparison between a LTE cell and a NR cell.

FIGS. 9 to 12 show some examples of the concept of a cell in 5G NR. FIG. 9 shows an exemplary deployment with single TRP cell. FIG. 10 shows an exemplary deployment with multiple TRP cells. FIG. 11 shows an exemplary 5G cell comprising a 5G node with multiple TRPs. FIG. 12 shows an exemplary comparison between a LTE cell and a NR cell.

Figure 23:
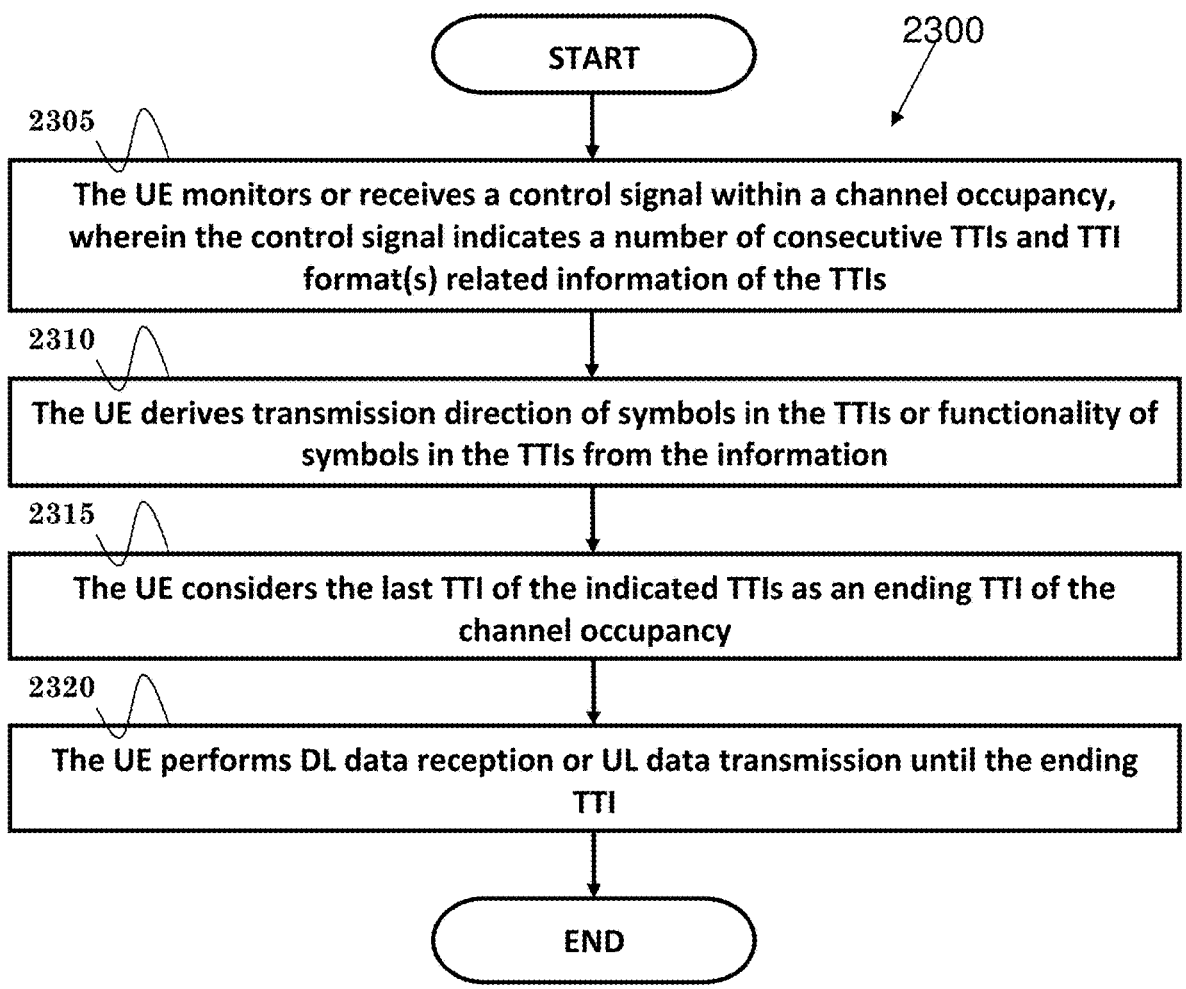
FIG. 23 is a flow chart according to one exemplary embodiment.

FIG. 6.1.3.5-1 of 3GPP TS 36.321 v13.2.0, Entitled "Timing Advance Command MAC Control Element", is Reproduced as FIG. 23

Figure 24:
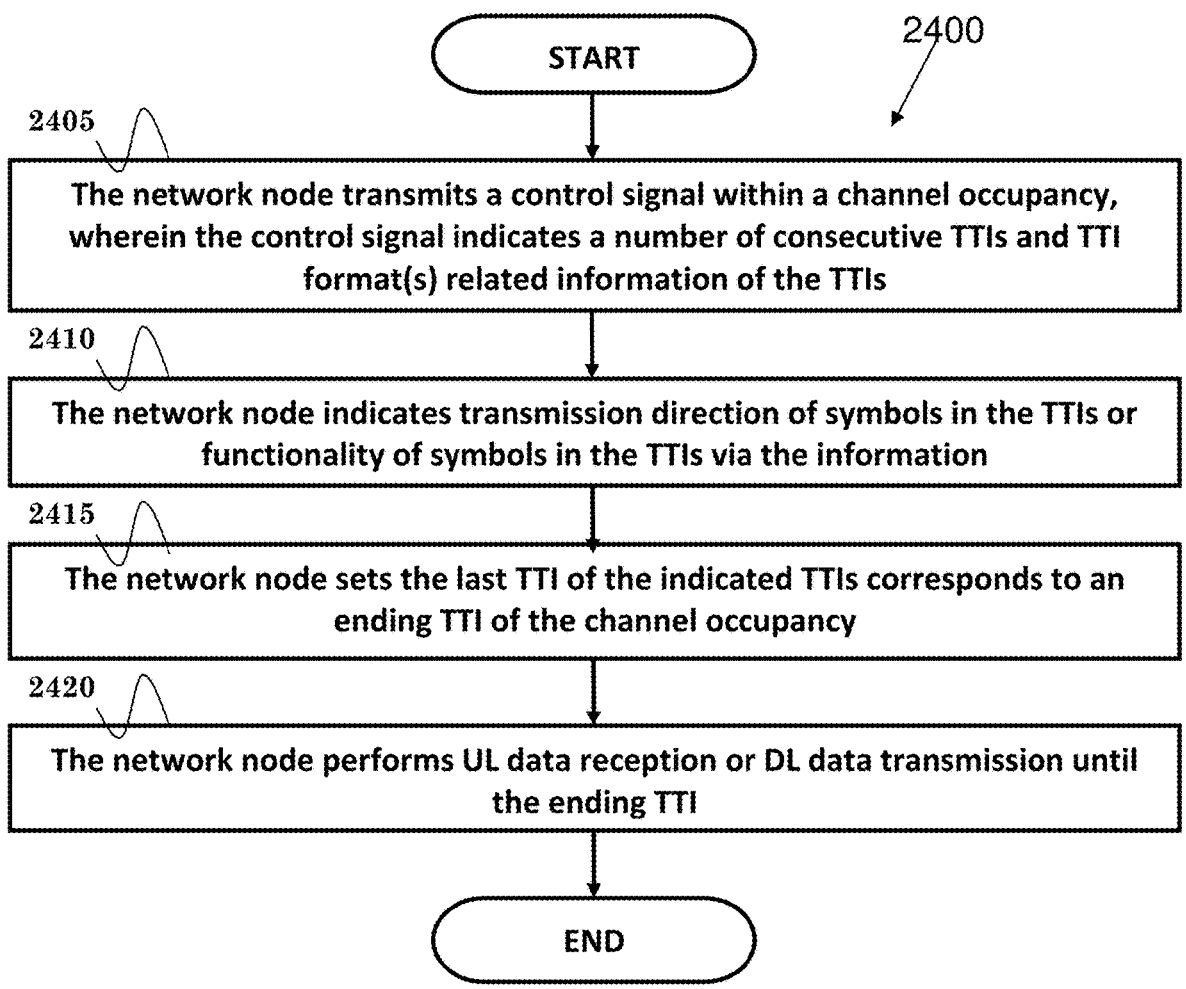
FIG. 24 is a flow chart according to one exemplary embodiment.

FIG. 6.1.5-1 of 3GPP TS 36.321 v13.2.0, Entitled "E/T/RAPID MAC Subheader", is Reproduced as FIG. 24

The LAA (Licensed-Assisted Access) subframe configuration is specified in 3GPP TS 36.213 as follows:
13A Subframe Configuration for Frame Structure Type 3
If a UE detects PDCCH with DCI CRC scrambled by CC-RNTI in subframe n−1 or subframe n of a LAA Scell, the UE may assume the configuration of occupied OFDM symbols in subframe n of the LAA Scell according to the 'Subframe configuration for LAA' field in the detected DCI in subframe n−1 or subframe n.
The 'Subframe configuration for LAA' field indicates the configuration of occupied OFDM symbols (i.e., OFDM symbols used for transmission of downlink physical channels and/or physical signals) in current and/or next subframe according to Table 13A-1.

If the configuration of occupied OFDM symbols for subframe n is indicated by the Subframe configuration for LAA field in both subframe n−1 and subframe n, the UE may assume that the same configuration of occupied OFDM symbols is indicated in both subframe n−1 and subframe n.
If a UE detects PDCCH with DCI CRC scrambled by CC-RNTI in subframe n, and the UE does not detect PDCCH with DCI CRC scrambled by CC-RNTI in subframe n−1, and if the number of occupied OFDM symbols for subframe n indicated by the Subframe configuration for LAA field in subframe n is less than 14, the UE is not required to receive any other physical channels in subframe n except for PDCCH with DCI format 0A/0B/4A/4B if configured.
If a UE does not detect PDCCH with DCI CRC scrambled by CC-RNTI containing 'Subframe Configuration for LAA' field set to other than '1110' and '1111' in subframe n and the UE does not detect PDCCH with DCI CRC scrambled by CC-RNTI containing 'Subframe Configuration for LAA' field set to other than '1110' and '1111' in subframe n−1, the UE is not required to use subframe n for updating CSI measurement.
The UE may detect PDCCH with DCI CRC scrambled by CC-RNTI by monitoring the following PDCCH candidates according to DCI Format 1C.
  one PDCCH candidate at aggregation level L=4 with the CCEs corresponding to the PDCCH candidate given by CCEs numbered 0, 1, 2, 3
  one PDCCH candidate at aggregation level L=8 with the CCEs corresponding to the PDCCH candidate given by CCEs numbered 0, 1, 2, 3, 4, 5, 6, 7
If a serving cell is a LAA Scell, and if the higher layer parameter subframeStartPosition for the Scell indicates 's07', and if the UE detects PDCCH/EPDCCH intended for the UE starting in the second slot of a subframe, the UE may assume that OFDM symbols in the first slot of the subframe are not occupied, and all OFDM symbols in the second slot of the subframe are occupied,
If subframe n is a subframe in which OFDM symbols in the first slot are not occupied, the UE may assume that all the OFDM symbols are occupied in subframe n+1.

Table 13A-1 of 3GPP TS 36.213 V14.3.0, Entitled "Subframe Configuration for LAA in Current and Next Subframe", is Reproduced as FIG. 13

If a UE is configured with a LAA SCell for UL transmissions, and the UE detects PDCCH with DCI CRC scrambled by CC-RNTI in subframe n, the UE may be configured with a 'UL duration' and 'UL offset' for subframe n according to the 'UL duration and offset' field in the detected DCI. The 'UL duration and offset' field indicates the 'UL duration' and 'UL offset' according to Table 13A-2.
If the 'UL duration and offset' field configures an 'UL offset' l and an 'UL duration' d for subframe n, the UE is not required to receive any downlink physical channels and/or physical signals in subframe(s) n+l+i with i=0, 1, ..., d−1.

Table 13A-2 of 3GPP TS 36.213 V14.3.0, Entitled "UL Duration and Offset", is Reproduced as FIG. 14

15 Channel Access Procedures for LAA
15.1 Downlink Channel Access Procedures
An eNB operating LAA Scell(s) shall perform the channel access procedures described in this sub clause for accessing the channel(s) on which the LAA Scell(s) transmission(s) are performed.

15.1.1 Channel Access Procedure for Transmission(s) Including PDSCH/PDCCH/EPDCCH The eNB may transmit a transmission including PDSCH/PDCCH/EPDCCH on a carrier on which LAA Scell(s) transmission(s) are performed, after first sensing the channel to be idle during the slot durations of a defer duration $T_d$; and after the counter N is zero in step 4. The counter N is adjusted by sensing the channel for additional slot duration(s) according to the steps below:

1) set $N=N_{init}$, where $N_{init}$ is a random number uniformly distributed between 0 and $CW_p$, and go to step 4;
2) if $N>0$ and the eNB chooses to decrement the counter, set $N=N-1$;
3) sense the channel for an additional slot duration, and if the additional slot duration is idle, go to step 4; else, go to step 5;
4) if $N=0$, stop; else, go to step 2.
5) sense the channel until either a busy slot is detected within an additional defer duration $T_d$ or all the slots of the additional defer duration $T_d$ are detected to be idle;
6) if the channel is sensed to be idle during all the slot durations of the additional defer duration $T_d$, go to step 4; else, go to step 5;

If an eNB has not transmitted a transmission including PDSCH/PDCCH/EPDCCH on a carrier on which LAA Scell(s) transmission(s) are performed after step 4 in the procedure above, the eNB may transmit a transmission including PDSCH/PDCCH/EPDCCH on the carrier, if the channel is sensed to be idle at least in a slot duration $T_{sl}$ when the eNB is ready to transmit PDSCH/PDCCH/EPDCCH and if the channel has been sensed to be idle during all the slot durations of a defer duration $T_d$ immediately before this transmission. If the channel has not been sensed to be idle in a slot duration $T_{sl}$, when the eNB first senses the channel after it is ready to transmit or if the channel has been sensed to be not idle during any of the slot durations of a defer duration $T_d$ immediately before this intended transmission, the eNB proceeds to step 1 after sensing the channel to be idle during the slot durations of a defer duration $T_d$.

The defer duration $T_d$ consists of duration $T_f=16$ us immediately followed by $m_p$ consecutive slot durations where each slot duration is $T_{sl}=9$ us, and $T_f$ includes an idle slot duration $T_{sl}$ at start of $T_f$;

A slot duration $T_{sl}$ is considered to be idle if the eNB senses the channel during the slot duration, and the power detected by the eNB for at least 4 us within the slot duration is less than energy detection threshold $X_{Thresh}$. Otherwise, the slot duration $T_{sl}$ is considered to be busy.

$CW_{min, p} \leq CW_p \leq CW_{max, p}$ is the contention window. $CW_p$ adjustment is described in sub clause 15.1.3.

$CW_{min, p}$ and $CW_{max, p}$ are chosen before step 1 of the procedure above.

$m_p$, $CW_{min,p}$, and $CW_{max,p}$ are based on channel access priority class associated with the eNB transmission, as shown in Table 15.1.1-1.

$X_{Thresh}$ adjustment is described in sub clause 15.1.4

If the eNB transmits discovery signal transmission(s) not including PDSCH/PDCCH/EPDCCH when $N>0$ in the procedure above, the eNB shall not decrement N during the slot duration(s) overlapping with discovery signal transmission.

The eNB shall not continuously transmit on a carrier on which the LAA Scell(s) transmission(s) are performed, for a period exceeding $T_{m\ cot,\ p}$ as given in Table 15.1.1-1.

For $p=3$ and $p=4$, if the absence of any other technology sharing the carrier can be guaranteed on a long term basis (e.g. by level of regulation), $T_{m\ cot,\ p}=10$ ms, otherwise, $T_{m\ cot,\ p}=8$ ms.

Table 15.1.1-1 of 3GPP TS 36.213 V14.3.0, Entitled "Channel Access Priority Class", is Reproduced as FIG. 15

For LAA operation in Japan, if the eNB has transmitted a transmission after $N=0$ in step 4 of the procedure above, the eNB may transmit the next continuous transmission, for duration of maximum $T_j=4$ msec, immediately after sensing the channel to be idle for at least a sensing interval of $T_{js}=34$ usec and if the total sensing and transmission time is not more than $1000 \cdot T_{mcot} + \lceil T_{mcot}/T_j - 1 \rceil \cdot T_{js}$ µsec. $T_{js}$ consists of duration $T_f=16$ us immediately followed by two slot durations $T_{sl}=9$ us each and $T_f$ includes an idle slot duration $T_{sl}$ at start of $T_f$. The channel is considered to be idle for $T_{js}$ if it is sensed to be idle during the during the slot durations of $T_{js}$.

15.1.2 Channel Access Procedure for Transmissions Including Discovery Signal Transmission(s) and not Including PDSCH An eNB may transmit a transmission including discovery signal but not including PDSCH on a carrier on which LAA Scell(s) transmission(s) are performed immediately after sensing the channel to be idle for at least a sensing interval $T_{drs}=25$ us and if the duration of the transmission is less than 1 ms. $T_{drs}$ consists of a duration $T_f=16$ us immediately followed by one slot duration $T_{sl}=9$ us and $T_f$ includes an idle slot duration $T_{sl}$ at start of $T_f$. The channel is considered to be idle for $T_{drs}$ if it is sensed to be idle during the slot durations of $T_{drs}$.

15.1.3 Contention Window Adjustment Procedure

If the eNB transmits transmissions including PDSCH that are associated with channel access priority class p on a carrier, the eNB maintains the contention window value $CW_p$ and adjusts $CW_p$ before step 1 of the procedure described in sub clause 15.1.1 for those transmissions using the following steps:

1) for every priority class $p \in \{1, 2, 3, 4\}$ set $CW_p = CW_{min, p}$
2) if at least $Z=80\%$ of HARQ-ACK values corresponding to PDSCH transmission(s) in reference subframe k are determined as NACK, increase $CW_p$ for every priority class $p \in \{1, 2, 3, 4\}$ to the next higher allowed value and remain in step 2; otherwise, go to step 1.

Reference subframe k is the starting subframe of the most recent transmission on the carrier made by the eNB, for which at least some HARQ-ACK feedback is expected to be available.

The eNB shall adjust the value of $CW_p$ for every priority class $p \in \{1, 2, 3, 4\}$ based on a given reference subframe k only once.

If $CW_p=CW_{max,p}$, the next higher allowed value for adjusting $CW_p$ is $CW_{max,p}$.

For determining Z,
- if the eNB transmission(s) for which HARQ-ACK feedback is available start in the second slot of subframe k, HARQ-ACK values corresponding to PDSCH transmission(s) in subframe k+1 are also used in addition to the HARQ-ACK values corresponding to PDSCH transmission(s) in subframe k.
- if the HARQ-ACK values correspond to PDSCH transmission(s) on an LAA SCell that are assigned by (E)PDCCH transmitted on the same LAA SCell, if no HARQ-ACK feedback is detected for a PDSCH transmission by the eNB, or if the eNB detects-'DTX', 'NACK/DTX' or 'any' state, it is counted as NACK.

if the HARQ-ACK values correspond to PDSCH transmission(s) on an LAA SCell that are assigned by (E)PDCCH transmitted on another serving cell,
if the HARQ-ACK feedback for a PDSCH transmission is detected by the eNB, 'NACK/DTX' or 'any' state is counted as NACK, and 'DTX' state is ignored.
if no HARQ-ACK feedback is detected for a PDSCH transmission by the eNB
if PUCCH format 1b with channel selection is expected to be used by the UE, 'NACK/DTX' state corresponding to 'no transmission' as described in Subclauses 10.1.2.2.1, 10.1.3.1 and 10.1.3.2.1 is counted as NACK, and 'DTX' state corresponding to 'no transmission' is ignored.—
Otherwise, the HARQ-ACK for the PDSCH transmission is ignored.

if a PDSCH transmission has two codewords, the HARQ-ACK value of each codeword is considered separately bundled HARQ-ACK across M subframes is considered as M HARQ-ACK responses.

If the eNB transmits transmissions including PDCCH/EPDCCH with DCI format 0A/0B/4A/4B and not including PDSCH that are associated with channel access priority class p on a channel starting from time $t_0$, the eNB maintains the contention window value $CW_p$ and adjusts $CW_p$ before step 1 of the procedure described in sub clause 15.1.1 for those transmissions using the following steps:

1) for every priority class $p \in \{1, 2, 3, 4\}$ set $CW_p = CW_{min,p}$
2) if less than 10% of the UL transport blocks scheduled by the eNB using Type 2 channel access procedure (described in sub clause 15.2.1.2) in the time interval between $t_0$ and $t_0+T_{CO}$ have been received successfully, increase $CW_p$ for every priority class $p \in \{1, 2, 3, 4\}$ to the next higher allowed value and remain in step 2; otherwise, go to step 1.

where $T_{CO}$ is computed as described in Subclause 15.2.1.
If the $CW_p = CW_{max,p}$ is consecutively used K times for generation of $N_{init}$, $CW_p$ is reset to $CW_{min,p}$ only for that priority class p for which $CW_p = CW_{max,p}$ is consecutively used K times for generation of $N_{init}$. K is selected by eNB from the set of values $\{1, 2, \ldots, 8\}$ for each priority class $p \in \{1, 2, 3, 4\}$.

15.1.4 Energy Detection Threshold Adaptation Procedure
An eNB accessing a carrier on which LAA SCell(s) transmission(s) are performed, shall set the energy detection threshold ($X_{Thresh}$) to be less than or equal to the maximum energy detection threshold $X_{Thresh\_max}$.
$X_{Thresh\_max}$ is determined as follows:
If the absence of any other technology sharing the carrier can be guaranteed on a long term basis (e.g. by level of regulation) then:

$$X_{Thresh\_max} = \min\left\{ \begin{array}{l} T_{max} + 10\,dB, \\ X_r \end{array} \right\}$$

$X_r$ is Maximum energy detection threshold defined by regulatory requirements in dBm when such requirements are defined, otherwise $X_r = T_{max} + 10$ dB Otherwise, $$X_{Thres\_max} = \max\left\{ \begin{array}{l} -72 + 10 \cdot \log10(BWMHz/20\,\text{MHz})dBm, \\ \min\left\{ \begin{array}{l} T_{max}, \\ T_{max} - T_A + (P_H + 10 \cdot \log10(BWMHz/20\,\text{MHz}) - P_{TX}) \end{array} \right\} \end{array} \right\}$$

Where:
$T_A = 10$ dB for transmission(s) including PDSCH;
$T_A = 5$ dB for transmissions including discovery signal transmission(s) and not including PDSCH;
$P_H = 23$ dBm;
$P_{TX}$ is the set maximum eNB output power in dBm for the carrier;
eNB uses the set maximum transmission power over a single carrier irrespective of whether single carrier or multi-carrier transmission is employed
$T_{max}$ (dBm)=$10 \cdot \log 10(3.16228 \cdot 10^{-8}$ (mW/MHz) $\cdot$ BWMHz (MHz));

BWMHz is the single carrier bandwidth in MHz.
15.1.5 Channel Access Procedure for Transmission(s) on Multiple Carriers
An eNB can access multiple carriers on which LAA Scell(s) transmission(s) are performed, according to one of the Type A or Type B procedures described in this Subclause.
15.1.5.1 Type A Multi-Carrier Access Procedures
The eNB shall perform channel access on each carrier $c_i \in C$, according to the procedures described in Subclause 15.1.1, where C is a set of carriers on which the eNB intends to transmit, and $i=0, 1, \ldots q-1$, and q is the number of carriers on which the eNB intends to transmit.
The counter N described in Subclause 15.1.1 is determined for each carrier $c_i$ and is denoted as $N_{c_i} \cdot N_{c_i}$ is maintained according to Subclause 15.1.5.1.1 or 15.1.5.1.2.
15.1.5.1.1 Type A1
Counter N as described in Subclause 15.1.1 is independently determined for each carrier $c_i$ and is denoted as $N_{c_i}$.
If the absence of any other technology sharing the carrier cannot be guaranteed on a long term basis (e.g. by level of regulation), when the eNB ceases transmission on any one carrier $c_j \in C$, for each carrier $c_i \neq c_j$, the eNB can resume decrementing $N_{c_i}$ when idle slots are detected either after waiting for a duration of $4 \cdot T_{sl}$, or after reinitialising $N_{c_i}$.
15.1.5.1.2 Type A2
Counter N is determined as described in Subclause 15.1.1 for carrier $c_j \in C$, and is denoted as $N_{c_j}$, where $c_j$ is the carrier that has the largest $CW_p$ value. For each carrier $c_i$, $N_{c_i} = N_{c_j}$. When the eNB ceases transmission on any one carrier for which $N_{c_i}$ is determined, the eNB shall reinitialise $N_{c_i}$ for all carriers.
15.1.5.2 Type B Multi-Carrier Access Procedure
A carrier $c_j \in C$ is selected by the eNB as follows
the eNB selects $c_j$ by uniformly randomly choosing $c_j$ from C before each transmission on multiple carriers $c_i \in C$, or
the eNB selects $c_j$ no more frequently than once every 1 second,
where C is a set of carriers on which the eNB intends to transmit, $i=0, 1, \ldots q-1$, and q is the number of carriers on which the eNB intends to transmit.
To transmit on carrier $c_j$
the eNB shall perform channel access on carrier $c_j$ according to the procedures described in Subclause 15.1.1 with the modifications described in 15.1.5.2.1 or 15.1.5.2.2.

To transmit on carrier $c_i \neq c_j$, $c_i \in C$
  for each carrier $c_i$, the eNB shall sense the carrier $c_i$ for at least a sensing interval $T_{mc}$=25 us immediately before the transmitting on carrier $c_j$, and the eNB may transmit on carrier $c_i$ immediately after sensing the carrier $c_i$ to be idle for at least the sensing interval $T_{mc}$. The carrier $c_i$ is considered to be idle for $T_{mc}$ if the channel is sensed to be idle during all the time durations in which such idle sensing is performed on the carrier $c_j$ in given interval $T_{mc}$.
The eNB shall not continuously transmit on a carrier $c_i \neq c_j$, $c_i \in C$, for a period exceeding $T_{m\ cot,\ p}$ as given in Table 15.1.1-1, where the value of $T_{m\ cot,p}$ is determined using the channel access parameters used for carrier $c_j$.
15.1.5.2.1 Type B1
A single $CW_p$ value is maintained for the set of carriers C. For determining $CW_p$ for channel access on carrier $c_j$, step 2 of the procedure described in sub clause 15.1.3 is modified as follows
  if at least Z=80% of HARQ-ACK values corresponding to PDSCH transmission(s) in reference subframe k of all carriers $c_i \in C$ are determined as NACK, increase $CW_p$ for each priority class $p \in \{1, 2, 3, 4\}$ to the next higher allowed value; otherwise, go to step 1.
15.1.5.2.2 Type B2
A $CW_p$ value is maintained independently for each carrier $c_i \in C$ using the procedure described in Subclause 15.1.3.
For determining $N_{init}$ for carrier $c_j$, $CW_p$ value of carrier $c_{j1} \in C$ is used, where $c_{j1}$ is the carrier with largest $CW_p$ among all carriers in set C.
15.2 Uplink Channel Access Procedures
A UE and a eNB scheduling UL transmission(s) for the UE shall perform the procedures described in this sub clause for the UE to access the channel(s) on which the LAA Scell(s) transmission(s) are performed.
15.2.1 Channel Access Procedure for Uplink Transmission(s)
The UE can access a carrier on which LAA Scell(s) UL transmission(s) are performed according to one of Type 1 or Type 2 UL channel access procedures. Type 1 channel access procedure is described in sub clause 15.2.1.1. Type 2 channel access procedure is described in sub clause 15.2.1.2.
If an UL grant scheduling a PUSCH transmission indicates Type 1 channel access procedure, the UE shall use Type 1 channel access procedure for transmitting transmissions including the PUSCH transmission unless stated otherwise in this sub clause.
If an UL grant scheduling a PUSCH transmission indicates Type 2 channel access procedure, the UE shall use Type 2 channel access procedure for transmitting transmissions including the PUSCH transmission unless stated otherwise in this sub clause.
The UE shall use Type 1 channel access procedure for transmitting SRS transmissions not including a PUSCH transmission. UL channel access priority class p=1 is used for SRS transmissions not including a PUSCH.
If the UE is scheduled to transmit PUSCH and SRS in subframe n, and if the UE cannot access the channel for PUSCH transmission in subframe n, the UE shall attempt to make SRS transmission in subframe n according to uplink channel access procedures specified for SRS transmission.

Table 15.2.1-1 of 3GPP TS 36.213 V14.3.0, Entitled "Channel Access Priority Class for UL", is Reproduced as FIG. 16

If the 'UL duration and offset' field configures an 'UL offset' l and an 'UL duration' d for subframe n, then
the UE may use channel access Type 2 for transmissions in subframes n+l+i where i=0, 1, . . . d−1, irrespective of the channel access Type signalled in the UL grant for those subframes, if the end of UE transmission occurs in or before subframe n+l+d−1.
If the UE scheduled to transmit transmissions including PUSCH in a set subframes $n_0, n_1, \ldots, n_{w-1}$, using PDCCH DCI Format 0B/4B, and if the UE cannot access the channel for a transmission in subframe $n_k$, the UE shall attempt to make a transmission in subframe $n_{k+1}$ according to the channel access type indicated in the DCI, where $k \in \{0, 1, \ldots w-2\}$, and w is the number of scheduled subframes indicated in the DCI.
If the UE is scheduled to transmit transmissions without gaps including PUSCH in a set of subframes $n_0, n_1, \ldots, n_{w-1}$ using one or more PDCCH DCI Format 0A/0B/4A/4B and the UE performs a transmission in subframe $n_k$ after accessing the carrier according to one of Type 1 or Type 2 UL channel access procedures, the UE may continue transmission in subframes after $n_k$ where k $\{0, 1, \ldots w-1\}$.
If the beginning of UE transmission in subframe n+1 immediately follows the end of UE transmission in subframe n, the UE is not expected to be indicated with different channel access types for the transmissions in those subframes.
If the UE is scheduled to transmit without gaps in subframes $n_0, n_1, \ldots, n_{w-1}$ using one or more PDCCH DCI Format 0A/0B/4A/4B, and if the UE has stopped transmitting during or before subframe $n_{k1}$, $k1 \in \{0, 1, \ldots w-2\}$, and if the channel is sensed by the UE to be continuously idle after the UE has stopped transmitting, the UE may transmit in a later subframe $n_{k2}$, $k2 \in \{1, \ldots w-1\}$ using Type 2 channel access procedure. If the channel sensed by the UE is not continuously idle after the UE has stopped transmitting, the UE may transmit in a later subframe $n_{k2}$, $k2 \in \{1, \ldots w-1\}$ using Type 1 channel access procedure with the UL channel access priority class indicated in the DCI corresponding to subframe $n_{k2}$.
If the UE receives an UL grant and the DCI indicates a PUSCH transmission starting in subframe n using Type 1 channel access procedure, and if the UE has an ongoing Type 1 channel access procedure before subframe n.
  if the UL channel access priority class value $p_1$ used for the ongoing Type 1 channel access procedure is same or larger than the UL channel access priority class value $p_2$ indicated in the DCI, the UE may transmit the PUSCH transmission in response to the UL grant by accessing the carrier by using the ongoing Type 1 channel access procedure.
  if the UL channel access priority class value $p_1$ used for the ongoing Type 1 channel access procedure is smaller than the UL channel access priority class value $p_2$ indicated in the DCI, the UE shall terminate the ongoing channel access procedure.
If the UE is scheduled to transmit on a set of carriers C in subframe n, and if the UL grants scheduling PUSCH transmissions on the set of carriers C indicate Type 1 channel access procedure, and if the same 'PUSCH starting position' is indicated for all carriers in the set of carriers C, and if the carrier frequencies of set of carriers C is a subset of one of the sets of carrier frequencies defined in Subclause 5.7.4 in [7]
  the UE may transmit on carrier $c_i \in C$ using Type 2 channel access procedure,
    if Type 2 channel access procedure is performed on carrier $c_i$ immediately before the UE transmission on carrier $c_j \in C$, $i \neq j$, and if the UE has accessed carrier $c_j$ using Type 1 channel access procedure,
  where carrier $c_j$ is selected by the UE uniformly randomly from the set of carriers C before performing Type 1 channel access procedure on any carrier in the set of carriers C.

A eNB may indicate Type 2 channel access procedure in the DCI of an UL grant scheduling transmission(s) including PUSCH on a carrier in subframe n when the eNB has transmitted on the carrier according to the channel access procedure described in sub clause 15.1.1, or an eNB may indicate using the 'UL duration and offset' field that the UE may perform a Type 2 channel access procedure for transmissions(s) including PUSCH on a carrier in subframe n when the eNB has transmitted on the carrier according to the channel access procedure described in sub clause 15.1.1, or an eNB may schedule transmissions including PUSCH on a carrier in subframe n, that follows a transmission by the eNB on that carrier with a duration of $T_{short\_ul}=25$ us, if subframe n occurs within the time interval starting at $t_0$ and ending at $t_0+T_{CO}$, where $T_{CO}=T_{m\ cot,\ p}+T_g$, where
  $t_0$ is the time instant when the eNB has started transmission,
  $T_{m\ cot,\ p}$ value is determined by the eNB as described in sub clause 15.1,
  $T_g$ is the total duration of all gaps of duration greater than 25 us that occur between the DL transmission of the eNB and UL transmissions scheduled by the eNB, and between any two UL transmissions scheduled by the eNB starting from $t_0$.

The eNB shall schedule UL transmissions between $t_0$ and $t_0+T_{CO}$ in contiguous subframes if they can be scheduled contiguously.

For an UL transmission on a carrier that follows a transmission by the eNB on that carrier within a duration of $T_{short\_ul}=25$ us, the UE may use Type 2 channel access procedure for the UL transmission.

If the eNB indicates Type 2 channel access procedure for the UE in the DCI, the eNB indicates the channel access priority class used to obtain access to the channel in the DCI.

15.2.1.1 Type 1 UL Channel Access Procedure

The UE may transmit the transmission using Type 1 channel access procedure after first sensing the channel to be idle during the slot durations of a defer duration $T_d$; and after the counter N is zero in step 4. The counter N is adjusted by sensing the channel for additional slot duration(s) according to the steps described below.

1) set $N=N_{init}$, where $N_{init}$ is a random number uniformly distributed between 0 and $CW_p$, and go to step 4;
2) if N>0 and the UE chooses to decrement the counter, set N=N−1;
3) sense the channel for an additional slot duration, and if the additional slot duration is idle, go to step 4; else, go to step 5;
4) if N=0, stop; else, go to step 2.
5) sense the channel until either a busy slot is detected within an additional defer duration $T_d$ or all the slots of the additional defer duration $T_d$ are detected to be idle;
6) if the channel is sensed to be idle during all the slot durations of the additional defer duration $T_d$, go to step 4; else, go to step 5;

If the UE has not transmitted a transmission including PUSCH or SRS on a carrier on which LAA Scell(s) transmission(s) are performed after step 4 in the procedure above, the UE may transmit a transmission including PUSCH or SRS on the carrier, if the channel is sensed to be idle at least in a slot duration $T_{sl}$ when the UE is ready to transmit the transmission including PUSCH or SRS, and if the channel has been sensed to be idle during all the slot durations of a defer duration $T_d$ immediately before the transmission including PUSCH or SRS. If the channel has not been sensed to be idle in a slot duration $T_{sl}$ when the UE first senses the channel after it is ready to transmit, or if the channel has not been sensed to be idle during any of the slot durations of a defer duration $T_d$ immediately before the intended transmission including PUSCH or SRS, the UE proceeds to step 1 after sensing the channel to be idle during the slot durations of a defer duration $T_d$.

The defer duration $T_d$ consists of duration $T_f=16$ us immediately followed by $m_p$ consecutive slot durations where each slot duration is $T_{sl}=9$ us, and $T_f$ includes an idle slot duration $T_{sl}$ at start of $T_f$;

A slot duration $T_{sl}$ is considered to be idle if the UE senses the channel during the slot duration, and the power detected by the UE for at least 4 us within the slot duration is less than energy detection threshold $X_{Thresh}$. Otherwise, the slot duration $T_{sl}$ is considered to be busy. $CW_{min,p} \le CW_p \le CW_{max,p}$ is the contention window. $CW_p$ adjustment is described in sub clause 15.2.2.

$CW_{min,p}$ and $CW_{max,p}$ are chosen before step 1 of the procedure above.

$m_p$, $CW_{min,p}$ and $CW_{max,p}$ are based on channel access priority class signalled to the UE, as shown in Table 15.2.1-1.

$X_{Thresh}$ adjustment is described in sub clause 15.2.3.

15.2.1.2 Type 2 UL Channel Access Procedure

If the UL UE uses Type 2 channel access procedure for a transmission including PUSCH, the UE may transmit the transmission including PUSCH immediately after sensing the channel to be idle for at least a sensing interval $T_{short\_ul}=25$ us. $T_{short\_ul}$ consists of a duration $T_f=16$ us immediately followed by one slot duration $T_{sl}=9$ us and $T_f$ includes an idle slot duration $T_{sl}$ at start of $T_f$. The channel is considered to be idle for $T_{short\_ul}$ if it is sensed to be idle during the slot durations of $T_{short\_ul}$.

15.2.2 Contention Window Adjustment Procedure

If the UE transmits transmissions using Type 1 channel access procedure that are associated with channel access priority class p on a carrier, the UE maintains the contention window value $CW_p$ and adjusts $CW_p$ for those transmissions before step 1 of the procedure described in sub clause 15.2.1.1, using the following procedure
  if the NDI value for at least one HARQ process associated with HARQ_ID_ref is toggled,
    for every priority class $p \in \{1, 2, 3, 4\}$ set $CW_p = CW_{min,p}$
  otherwise, increase $CW_p$ for every priority class $p \in \{1, 2, 3, 4\}$ to the next higher allowed value;

HARQ_ID_ref is the HARQ process ID of UL-SCH in reference subframe $n_{ref}$. The reference subframe $n_{ref}$ is determined as follows
  If the UE receives an UL grant in subframe $n_g$, subframe $n_w$ is the most recent subframe before subframe $n_g-3$ in which the UE has transmitted UL-SCH using Type 1 channel access procedure.
    If the UE transmits transmissions including UL-SCH without gaps starting with subframe $n_0$ and in subframes $n_0, n_1, \ldots, n_w$, reference subframe $n_{ref}$ is subframe $n_0$,
    otherwise, reference subframe $n_{ref}$ is subframe $n_w$, The UE may keep the value of $CW_p$ unchanged for every priority class $p \in \{1, 2, 3, 4\}$, if the UE scheduled to transmit transmissions without gaps including PUSCH in a set subframes $n_0, n_1, \ldots, n_{w-1}$ using Type 1 channel access procedure, and if the UE is not able to transmit any transmission including PUSCH in the set of subframes.

The UE may keep the value of $CW_p$ for every priority class $p \in \{1, 2, 3, 4\}$ the same as that for the last scheduled transmission including PUSCH using Type 1 channel access procedure, if the reference subframe for the last scheduled transmission is also $n_{ref}$.

If $CW_p = CW_{max,p}$, the next higher allowed value for adjusting $CW_p$ is $CW_{max,p}$.

If the $CW_p = CW_{max,p}$ is consecutively used K times for generation of $N_{init}$, $CW_p$ is reset to $CW_{min,p}$ only for that priority class p for which $CW_p = CW_{max,p}$ is consecutively used K times for generation of $N_{init}$. K is selected by UE from the set of values $\{1, 2, \ldots, 8\}$ for each priority class $p \in \{1, 2, 3, 4\}$.

15.2.3 Energy Detection Threshold Adaptation Procedure

A UE accessing a carrier on which LAA Scell(s) transmission(s) are performed, shall set the energy detection threshold ($X_{Thresh}$), to be less than or equal to the maximum energy detection threshold $X_{Thresh\_max}$.

$X_{Thresh\_max}$ is determined as follows:

If the UE is configured with higher layer parameter 'maxEnergyDetectionThreshold-r14', $X_{Thresh\_max}$ is set equal to the value signalled by the higher layer parameter.

otherwise the UE shall determine $X'_{Thresh\_max}$ according to the procedure described in sub clause 15.2.3.1 if the UE is configured with higher layer parameter 'energyDetectionThresholdOffset-r14'

$X_{Thresh\_max}$ is set by adjusting $X'_{Thresh\_max}$ according to the offset value signalled by the higher layer parameter otherwise The UE shall set $X_{Thresh\_max} = X'_{Thresh\_max}$ 15.2.3.1 Default Maximum Energy Detection Threshold Computation Procedure If the higher layer parameter 'absenceOfAnyOtherTechnology-r14' indicates TRUE:

$$X'_{Thresh\_max} = \min \begin{Bmatrix} T_{max} + 10\,dB, \\ X_r \end{Bmatrix}$$

where $X_r$ is Maximum energy detection threshold defined by regulatory requirements in dBm when such requirements are defined, otherwise $X_r = T_{max} + 10$ dB otherwise $$X'_{Thres\_max} = \max \begin{Bmatrix} -72 + 10 \cdot \log 10(BWMHz/20\text{ MHz})dBm, \\ \min \begin{Bmatrix} T_{max}, \\ T_{max} - T_A + (P_H + 10 \cdot \log 10(BWMHz/20\text{ MHz}) - P_{TX}) \end{Bmatrix} \end{Bmatrix}$$

Where $T_A = 10$ dB $P_H = 23$ dBm;

$P_{TX}$ is the set to the value of $P_{CMAX\_H, c}$ as defined in [6].

$T_{max}$ (dBm)=10·log 10(3.16228·10$^{-8}$ (mW/MHz)· BWMHz (MHz));

BWMHz is the single carrier bandwidth in MHz.

The DCI format design received in LAA cell is specified in 3GPP TS 36.212 as follows:

5.3.3.1.1A Format 0A

DCI format 0A is used for the scheduling of PUSCH in a LAA SCell.

The following information is transmitted by means of the DCI format 0A:

Carrier indicator—0 or 3 bits. This field is present according to the definitions in [3].

Flag for format0A/format1A differentiation—1 bit, where value 0 indicates format 0A and value 1 indicates format 1A.

PUSCH trigger A—1 bit, where value 0 indicates non-triggered scheduling and value 1 indicates triggered scheduling as defined in section 8.0 of [3].

Timing offset—4 bits as defined in section 8.0 of [3].

When the PUSCH trigger A is set to 0,

The field indicates the absolute timing offset for the PUSCH transmission.

Otherwise,

The first two bits of the field indicate the timing offset, relative to the UL offset 1 as defined in section 13A of [3], for the PUSCH transmission.

The last two bits of the field indicate the time window within which the scheduling of PUSCH via triggered scheduling is valid.

Resource block assignment—5 or 6 bits provide the resource allocation in the UL subframe as defined in section 8.1.4 of [3]

Modulation and coding scheme—5 bits as defined in section 8.6 of [3]

HARQ process number—4 bits.

New data indicator—1 bit

Redundancy version—2 bits as defined in section 8.6.1 of [3]

TPC command for scheduled PUSCH—2 bits as defined in section 5.1.1.1 of [3]

Cyclic shift for DM RS and OCC index—3 bits as defined in section 5.5.2.1.1 of [2]

CSI request—1, 2 or 3 bits as defined in section 7.2.1 of [3]. The 2-bit field applies to UEs configured with no more than five DL cells and to UEs that are configured with more than one DL cell and when the corresponding DCI format is mapped onto the UE specific search space given by the C-RNTI as defined in [3];

UEs that are configured by higher layers with more than one CSI process and when the corresponding DCI format is mapped onto the UE specific search space given by the C-RNTI as defined in [3];

UEs that are configured with two CSI measurement sets by higher layers with the parameter csi-MeasSubframeSet, and when the corresponding DCI format is mapped onto the UE specific search space given by the C-RNTI as defined in [3];

the 3-bit field applies to UEs that are configured with more than five DL cells and when the corresponding DCI format is mapped onto the UE specific search space given by the C-RNTI as defined in [3];

otherwise the 1-bit field applies

SRS request—1 bit. The interpretation of this field is provided in section 8.2 of [3]

PUSCH starting position—2 bits as specified in Table 5.3.3.1.1A-1.

PUSCH ending symbol—1 bit, where value 0 indicates the last symbol of the subframe and value 1 indicates the second to last symbol of the subframe.

Channel Access type—1 bit as defined in section 15.2 of [3]

Channel Access Priority Class—2 bits as defined in section 15.2 of [3]

If the number of information bits in format 0A mapped onto a given search space is less than the payload size of format 1A for scheduling the same serving cell and mapped onto the same search space (including any padding bits appended to format 1A), zeros shall be appended to format 0A until the payload size equals that of format 1A.

Table 5.3.3.1.1A-1 of 3GPP TS 36.212 V14.3.0, Entitled "PUSCH Starting Position", is Reproduced as FIG. 17

5.3.3.1.1B Format 0B
DCI format 0B is used for the scheduling of PUSCH in each of multiple subframes in a LAA SCell.
The following information is transmitted by means of the DCI format 0B:
  Carrier indicator—0 or 3 bits. This field is present according to the definitions in [3].
  PUSCH trigger A—1 bit, where value 0 indicates non-triggered scheduling and value 1 indicates triggered scheduling as defined in section 8.0 of [3].
  Timing offset—4 bits as defined in section 8.0 of [3].
    When the PUSCH trigger A is set to 0,
      The field indicates the absolute timing offset for the PUSCH transmission.
    Otherwise,
      The first two bits of the field indicate the timing offset, relative to the UL offset 1 as described in section 13A of [3], for the PUSCH transmission.
      The last two bits of the field indicate the time window within which the scheduling of PUSCH via triggered scheduling is valid.
  Number of scheduled subframes—1 or 2 bits. The 1-bit field applies when maxNumberOfSchedSubframes-Format0B-r14 is configured by higher layers to two, otherwise the 2-bit field applies.
  Resource block assignment—5 or 6 bits provide the resource allocation in the UL subframe as defined in section 8.1.4 of [3].
  Modulation and coding scheme—5 bits as defined in section 8.6 of [3].
  HARQ process number—4 bits. The 4-bit applies to the first scheduled subframe, and the HARQ process numbers for other scheduled subframes are defined in section 8.0 of [3].
  New data indicator—maxNumberOfSchedSubframes-Format0B-r14 bits. Each scheduled PUSCH corresponds to 1 bit.
  Redundancy version—maxNumberOfSchedSubframes-Format0B-r14 bits. Each scheduled PUSCH corresponds to 1 bit as defined in section 8.6.1 of [3].
  TPC command for scheduled PUSCH—2 bits as defined in section 5.1.1.1 of [3].
  Cyclic shift for DM RS and OCC index—3 bits as defined in section 5.5.2.1.1 of [2].
  CSI request—1, 2 or 3 bits as defined in section 7.2.1 of [3]. The 2-bit field applies to UEs configured with no more than five DL cells and to
    UEs that are configured with more than one DL cell and when the corresponding DCI format is mapped onto the UE specific search space given by the C-RNTI as defined in [3];
    UEs that are configured by higher layers with more than one CSI process and when the corresponding DCI format is mapped onto the UE specific search space given by the C-RNTI as defined in [3];
    UEs that are configured with two CSI measurement sets by higher layers with the parameter csi-MeasSubframeSet, and when the corresponding DCI format is mapped onto the UE specific search space given by the C-RNTI as defined in [3];
  the 3-bit field applies to UEs that are configured with more than five DL cells and when the corresponding DCI format is mapped onto the UE specific search space given by the C-RNTI as defined in [3];
  otherwise the 1-bit field applies.
  SRS request—2 bits. The interpretation of this field is provided in section 8.2 of [3].
  PUSCH starting position—2 bits as specified in Table 5.3.3.1.1A-1 applicable to only the first scheduled subframe.
  PUSCH ending symbol—1 bit, where value 0 indicates the last symbol of the last scheduled subframe and value 1 indicates the second to last symbol of the last scheduled subframe.
  Channel Access type—1 bit as defined in section 15.2 of [3].
  Channel Access Priority Class—2 bits as defined in section 15.2 of [3].

If the number of information bits in format 0B is equal to the payload size for DCI format 1, 2, 2A, 2B, 2C or 2D associated with the configured DL transmission mode in the same serving cell, one zero bit shall be appended to format 0B.

[ . . . ]

5.3.3.1.8A Format 4A
DCI format 4 is used for the scheduling of PUSCH in a LAA SCell with multi-antenna port transmission mode.
The following information is transmitted by means of the DCI format 4A:
  Carrier indicator—0 or 3 bits. The field is present according to the definitions in [3].
  PUSCH trigger A—1 bit, where value 0 indicates non-triggered scheduling and value 1 indicates triggered scheduling as defined in section 8.0 of [3].
  Timing offset—4 bits as defined in section 8.0 of [3].
    When the PUSCH trigger A is set to 0,
    The field indicates the absolute timing offset for the PUSCH transmission.
    Otherwise,
    The first two bits of the field indicate the timing offset, relative to the UL offset 1 as defined in section 13A of [3], for the PUSCH transmission.
    The last two bits of the field indicate the time window within which the scheduling of PUSCH via triggered scheduling is valid.
  Resource block assignment—5 or 6 bits provide the resource allocation in the UL subframe as defined in section 8.1.4 of [3].
  HARQ process number-4 bits.
  Redundancy version—2 bits as defined in section 8.6.1 of [3] which is common for both transport blocks.
  TPC command for scheduled PUSCH—2 bits as defined in section 5.1.1.1 of [3]
  Cyclic shift for DM RS and OCC index—3 bits as defined in section 5.5.2.1.1 of [2]
  CSI request—1, 2 or 3 bits as defined in section 7.2.1 of [3]. The 2-bit field applies to UEs configured with no more than five DL cells and to
    UEs that are configured with more than one DL cell;

UEs that are configured by higher layers with more than one CSI process;

UEs that are configured with two CSI measurement sets by higher layers with the parameter csi-MeasSubframe-Set;

the 3-bit field applies to UEs that are configured with more than five DL cells;

otherwise the 1-bit field applies.

SRS request—2 bits as defined in section 8.2 of [3].

PUSCH starting position—2 bits as specified in Table 5.3.3.1.1A-1.

PUSCH ending symbol—1 bit, where value 0 indicates the last symbol of the subframe and value 1 indicates the second to last symbol of the subframe.

Channel Access type—1 bit as defined in section 15.2 of [3].

Channel Access Priority Class—2 bits as defined in section 15.2 of [3].

In addition, for transport block 1:
Modulation and coding scheme and redundancy version—5 bits as defined in section 8.6 of [3].
New data indicator—1 bit.

In addition, for transport block 2:
Modulation and coding scheme and redundancy version—5 bits as defined in section 8.6 of [3].
New data indicator—1 bit.

Precoding information and number of layers: number of bits as specified in Table 5.3.3.1.8-1. Bit field as shown in Table 5.3.3.1.8-2 and Table 5.3.3.1.8-3. Note that TPMI for 2 antenna ports indicates which codebook index is to be used in Table 5.3.3A.2-1 of [2], and TPMI for 4 antenna ports indicates which codebook index is to be used in Table 5.3.3A.2-2, Table 5.3.3A.2-3, Table 5.3.3A.2-4 and Table 5.3.3A.2-5 of [2]. If both transport blocks are enabled, transport block 1 is mapped to codeword 0; and transport block 2 is mapped to codeword 1. In case one of the transport blocks is disabled, the transport block to codeword mapping is specified according to Table 5.3.3.1.5-2. For a single enabled codeword, indices 24 to 39 in Table 5.3.3.1.8-3 are only supported for retransmission of the corresponding transport block if that transport block has previously been transmitted using two layers.

If the number of information bits in format 4A is equal to the payload size for DCI format 1, 2, 2A, 2B, 2C or 2D associated with the configured DL transmission mode in the same serving cell, one zero bit shall be appended to format 4A.

5.3.3.1.8B Format 4B

DCI format 4B is used for the scheduling of PUSCH with multi-antenna port transmission mode in each of multiple subframes in a LAA SCell.

The following information is transmitted by means of the DCI format 4B:

Carrier indicator—0 or 3 bits. The field is present according to the definitions in [3].

PUSCH trigger A—1 bit, where value 0 indicates non-triggered scheduling and value 1 indicates triggered scheduling as defined in section 8.0 of [3].

Timing offset—4 bits as defined in section 8.0 of [3].

When the PUSCH trigger A is set to 0,

The field indicates the absolute timing offset for the PUSCH transmission.

Otherwise,

The first two bits of the field indicate the timing offset, relative to the UL offset l as defined in section 13A of [3], for the PUSCH transmission.

The last two bits of the field indicate the time window within which the scheduling of PUSCH via triggered scheduling is valid.

Number of scheduled subframes—1 or 2 bits. The 1-bit field applies when maxNumberOfSchedSubframes-Format4B-r14 is configured by higher layers to two, otherwise the 2-bit field applies.

Resource block assignment—5 or 6 bits provide the resource allocation in the UL subframe as defined in section 8.1.4 of [3].

HARQ process number-4 bits. The 4-bit applies to the first scheduled subframe, and the HARQ process numbers for other scheduled subframes are defined in section 8.0 of [3].

Redundancy version—maxNumberOfSchedSubframes-Format4B-r14 bits. Each scheduled PUSCH corresponds to 1 bit as defined in section 8.6.1 of [3]. Redundancy version is common for both transport blocks.

TPC command for scheduled PUSCH—2 bits as defined in section 5.1.1.1 of [3].

Cyclic shift for DM RS and OCC index—3 bits as defined in section 5.5.2.1.1 of [2].

CSI request—1, 2 or 3 bits as defined in section 7.2.1 of [3]. The 2-bit field applies to UEs configured with no more than five DL cells and to UEs that are configured with more than one DL cell;

UEs that are configured by higher layers with more than one CSI process;

UEs that are configured with two CSI measurement sets by higher layers with the parameter csi-MeasSubframe-Set;

the 3-bit field applies to UEs that are configured with more than five DL cells;

otherwise the 1-bit field applies.

SRS request—2 bits as defined in section 8.2 of [3].

PUSCH starting position—2 bits as specified in Table 5.3.3.1.1A-1 applicable to only the first scheduled subframe.

PUSCH ending symbol—1 bit, where value 0 indicates the last symbol of the last scheduled subframe and value 1 indicates the second to last symbol of the last scheduled subframe.

Channel Access type—1 bit as defined in section 15.2 of [3].

Channel Access Priority Class—2 bits as defined in section 15.2 of [3].

In addition, for transport block 1:
Modulation and coding scheme and redundancy version—5 bits as defined in section 8.6 of [3].
New data indicator—maxNumberOfSchedSubframes-Format4B-r14 bits. Each scheduled PUSCH corresponds to 1 bit.

In addition, for transport block 2:
Modulation and coding scheme and redundancy version—5 bits as defined in section 8.6 of [3].
New data indicator—maxNumberOfSchedSubframes-Format4B-r14 bits. Each scheduled PUSCH corresponds to 1 bit.

Precoding information and number of layers: number of bits as specified in Table 5.3.3.1.8-1. Bit field as shown in Table 5.3.3.1.8-2 and Table 5.3.3.1.8-3. Note that TPMI for 2 antenna ports indicates which codebook index is to be used in Table 5.3.3A.2-1 of [2], and TPMI for 4 antenna ports indicates which codebook index is to be used in Table 5.3.3A.2-2, Table 5.3.3A.2-3, Table 5.3.3A.2-4 and Table 5.3.3A.2-5 of [2]. If both transport blocks are enabled, transport block 1 is mapped to codeword 0; and transport block 2 is mapped to codeword 1. In case one of the transport blocks is disabled, the transport block to codeword mapping is specified according to Table 5.3.3.1.5-2. For a single enabled codeword, indices 24 to 39 in Table 5.3.3.1.8-3 are only supported for retransmission of the corresponding transport block if that transport block has previously been transmitted using two layers.

If the number of information bits in format 4B is equal to the payload size for DCI format 1, 2, 2A, 2B, 2C or 2D associated with the configured DL transmission mode in the same serving cell, one zero bit shall be appended to format 4B.

The frame structure type 3 for LAA is specified in 3GPP TS 36.211 as follows:

4.3 Frame Structure Type 3

Frame structure type 3 is applicable to LAA secondary cell operation with normal cyclic prefix only. Each radio frame is $T_f=307200 \cdot T_s=10$ ms long and consists of 20 slots of length $T_{slot}=15360 \cdot T_s=0.5$ ms, numbered from 0 to 19. A subframe is defined as two consecutive slots where subframe i consists of slots 2i and 2i+1.

The 10 subframes within a radio frame are available for downlink or uplink transmissions. Downlink transmissions occupy one or more consecutive subframes, starting anywhere within a subframe and ending with the last subframe either fully occupied or following one of the DwPTS durations in Table 4.2-1. Uplink transmisisons occupy one or more consecutive subframes.

There are some agreements on beam management in RAN1 #85 meeting, as described in the Final Report of 3GPP TSG RAN WG1 #85 v1.0.0 (Nanjing, China, 23-27 May 2016) as follows:

R1-165559 WF on Supported NR Operations Samsung, Nokia, Alcatel Lucent Shanghai Bell Agreements:
  Following three implementations of beamforming are to be studied in NR
    Analog beamforming
    Digital beamforming
    Hybrid beamforming
    Note: The physical layer procedure design for NR can be agnostic to UE/TRP with respect to the beamforming implementations employed at TRP/UE, but it may pursue beamforming implementation specific optimization not to lose efficiency
  RAN1 studies both multi-beam based approaches and single-beam based approaches for these channels/signals/measurement/feedback
    Initial-access signals (synchronization signals and random access channels)
    System-information delivery
    RRM measurement/feedback
    L1 control channel
    Others are FFS
    Note: The physical layer procedure design for NR can be unified as much as possible whether multi-beam or single-beam based approaches are employed at TRP at least for synchronization signal detection in stand-alone initial access procedure
    Note: single beam approach can be a special case of multi beam approach
    Note: Individual optimization of single beam approach and multiple beam approach is possible
  Multi-beam based approaches
    In Multi-beam based approaches, multiple beams are used for covering a DL coverage area and/or UL coverage distance of a TRP/a UE
    One example of multi-beam based approaches is beam sweeping:
      When beam sweeping is applied for a signal (or a channel), the signal (the channel) is transmitted/received on multiple beams, which are on multiple time instances in finite time duration
        Single/multiple beam can be transmitted/received in a single time instance
    Others are FFS
  Single-beam based approaches
    In single-beam based approaches, the single beam can be used for covering a DL coverage area and/or UL coverage distance of a TRP/a UE, similarly as for LTE cell-specific channels/RS
  For both single-beam and multi-beam based approaches, RAN1 can consider followings in addition
    Power boosting
    SFN
    Repetition
    Beam diversity (only for multi-beam approach)
    Antenna diversity
    Other approaches are not precluded
  Combinations of single-beam based and multi-beam based approaches are not precluded R1-165564 WF on UE Beamforming and Beam Management Nokia, Samsung, Intel, Interdigital, Alcatel-Lucent Shanghai Bell Agreements:
  RAN1 to study the beamforming procedures and their system impacts at least for multi beam based approach
    Physical layer procedures for beamforming optimizing different metrics such as overheads and latencies in multi beam and single beam based approaches
    Physical layer procedures in multi beam based approach that require beam training, i.e. steering of transmitter and/or receiver beams
      E.g. Periodic/Aperiodic downlink/uplink TX/RX beam sweeping signals, where periodic signals may be semi-statically or dynamically configured (FFS)
      E.g. UL sounding signals
      Other example is not precluded R1-165684 WF on Beamforming Procedures Nokia Agreements:
  Both intra-TRP and inter-TRP beamforming procedures are considered.
  Beamforming procedures are considered with/without TRP beamforming/beam sweeping and with/without UE beamforming/beam sweeping, according to the following potential use cases:
    UE movement, UE rotation, beam blocking:
      Change of beam at TRP, same beam at UE
      Same beam at TRP, change of beam at UE
      Change of beam at TRP, change of beam at UE
    Other cases are not precluded There are some agreements on beam management in RAN1 #86 meeting, as described in the Final Report of 3GPP TSG RAN WG1 #86 v1.0.0 (Gothenburg, Sweden, 22-26 Aug. 2016) as follows:

R1-168278 WF on DL Beam Management Intel Corporation, Huawei, HISilicon, Ericsson, Nokia, Alcatel-Lucent Shanghai Bell, Verizon, MTK, LGE, NTT DoCoMo, Xinwei Agreements:
  The following DL L1/L2 beam management procedures are supported within one or multiple TRPs:
    P-1: is used to enable UE measurement on different TRP Tx beams to support selection of TRP Tx beams/UE Rx beam(s)
      For beamforming at TRP, it typically includes a intra/inter-TRP Tx beam sweep from a set of different beams
      For beamforming at UE, it typically includes a UE Rx beam sweep from a set of different beams
      FFS: TRP Tx beam and UE Rx beam can be determined jointly or sequentially
    P-2: is used to enable UE measurement on different TRP Tx beams to possibly change inter/intra-TRP Tx beam(s)
    From a possibly smaller set of beams for beam refinement than in P-1
      Note: P-2 can be a special case of P-1
    P-3: is used to enable UE measurement on the same TRP Tx beam to change UE Rx beam in the case UE uses beamforming
    Strive for the same procedure design for Intra-TRP and inter-TRP beam management
      Note: UE may not know whether it is intra-TRP or inter TRP beam
    Note: Procedures P-2&P-3 can be performed jointly and/or multiple times to achieve e.g. TRP Tx/UE Rx beam change simultaneously
    Note: Procedures P-3 may or may not have physical layer procedure spec. impact
    Support managing multiple Tx/Rx beam pairs for a UE
    Note: Assistance information from another carrier can be studied in beam management procedures
    Note that above procedure can be applied to any frequency band
    Note that above procedure can be used in single/multiple beam(s) per TRP
    Note: multi/single beam based initial access and mobility treated within a separate RAN1 agenda item
R1-168468 Definitions Supporting Beam Related Procedures Nokia, Qualcomm, CATT, Intel, NTT DoCoMo, Mediatek, Ericsson, ASB, Samsung, LGE
{
  Beam management=a set of L1/L2 procedures to acquire and maintain a set of TRP(s) and/or UE beams that can be used for DL and UL transmission/reception, which include at least following aspects:
    Beam determination=for TRP(s) or UE to select of its own Tx/Rx beam(s).
    Beam measurement=for TRP(s) or UE to measure characteristics of received beamformed signals
    Beam reporting=for UE to report information a property/quality of of beamformed signal(s) based on beam measurement
    Beam sweeping=operation of covering a spatial area, with beams transmitted and/or received during a time interval in a predetermined way.
R1-168389 WF on the Design of Downlink Control Channel ZTE Corporation, ZTE Microelectronics, Qualcomm, ASTRI, Intel Corporation
Revision of R1-168274
Agreements:
  Study the relationship of beam(s) used for L1 control channel and beam(s) used for data channel
    E.g. Using different beamwidth for data and control
    E.g. Using different beam directions for data and control
    E.g. At least one beam is shared by data and control
    E.g., same beam for data and control
  There are some agreements on beam management in RAN1 #86 meeting, as described in the Final Report of 3GPP TSG RAN WG1 #86bis v1.0.0 (Lisbon, Portugal, 10-14 Oct. 2016) as follows:
R1-1610658 Way Forward on Beam Management Ericsson, Samsung, Intel
Working Assumptions:
  Beam management procedures can utilize at least the following RS type(s):
    RS defined for mobility purpose at least in connected mode
      FFS: RS can be NR-SS or CSI-RS or newly designed RS
      Others are not precluded
    CSI-RS:
      CSI-RS is UE-specifically configured
        Multiple UE may be configured with the same CSI-RS
      The signal structure for CSI-RS can be specifically optimized for the particular procedure
      Note: CSI-RS can also be used for CSI acquisition
    Other RS could also be considered for beam management such as DMRS and synchronization signals
R1-1610891 WF on Group-Based Beam Management ZTE, ZTE Microelectronics, ASTRI, Nokia, ASB, CATT
Agreements:
  Group based beam management is to be further studied:
    Definition of beam grouping:
      Beam grouping=for TRP(s) or UE to group multiple Tx and/or Rx beam(s) and/or beam pair(s) into one subset of beams
      FFS detailed mechanisms for beam grouping, reporting, beam-group based indication for beam measurement, beam-based transmission or beam switching, etc.
      Some examples can be found in R1-1610891 and R1-1609414
R1-1610825 WF on Beam Management CATT, CATR, CMCC, Xinwei
Agreements:
  For downlink, NR supports beam management with and without beam-related indication
    When beam-related indication is provided, information pertaining to UE-side beamforming/receiving procedure used for data reception can be indicated through QCL to UE
      FFS: Information other than QCL
      FFS: When beam-related indication is provided, information pertaining to the Tx beam used for data transmission is indicated to UE
R1-1610511 WF on Beam Management for DL Control Channel ZTE, ZTE Microelectronics, Intel, Xinwei
Agreements:
  Support using same or different beams on control channel and the corresponding data channel transmissions
    FFS the antenna ports for control channel and the corresponding data channel (e.g., sharing some ports or not)
  Study detailed aspects related to beams/beam pairs indication/reporting involving usage of control and data channels and involving one or more TRPs R1-1610894 UL Beam Management Samsung, Huawei, Intel
Agreements:
  UL beam management is to be further studied in NR
    Similar procedures can be defined as DL beam management with details FFS, e.g.:
      U-1: is used to enable TRP measurement on different UE Tx beams to support selection of UE Tx beams/TRP Rx beam(s)
        Note: this is not necessarily useful in all cases
      U-2: is used to enable TRP measurement on different TRP Rx beams to possibly change/select inter/intra-TRP Rx beam(s)
      U-3: is used to enable TRP measurement on the same TRP Rx beam to change UE Tx beam in the case UE uses beamforming
    FFS Indication of information related to Tx/Rx beam correspondence is supported
    Study UL beam management based on:
      PRACH
      SRS
      DM-RS
      Other channels and reference signals are not precluded
    Study uplink beam management procedure by considering the Tx/Rx beam correspondence
      For the case of TRP and UE have Tx/Rx beam correspondence
      For the case of TRP has no Tx/Rx beam correspondence and/or UE has no Tx/Rx beam correspondence
  There are some agreements on beam management and/or group common PDCCH in RAN1 # AH1_NR meeting, as described in the Final Report of 3GPP TSG RAN WG1 # AH1_NR v1.0.0 (Spokane, USA, 16-20 Jan. 2017) as follows:
R1-1701317 WF on UL Beam Management MediaTek, LG, InterDigital, Vivo, Xinwei, ZTE, ZTE Microelectronics, Intel, ITRI, Huawei, HISilicon, CMCC, OPPO, Ericsson, DOCOMO
Working Assumption:
  NR supports at least one NW-controlled mechanism for beam management for UL transmission(s)
    Details are FFS, including at least the following study:
      Signal(s) for the mechanism(s) if necessary
        E.g., SRS, PRACH preamble, UL DMRS
        Additional contents can also be included, e.g., beam reporting
      Method(s) and content for TRP to indicate selected UE Tx beam and configure UE sweeping
      Impact of beam correspondence Status
        E.g., When to use the mechanism(s)
        E.g., Procedures such as U-1, U-2, U-3, and beam correspondence based procedure
      UE capability reporting
        E.g., capability of analog beamforming
      Consider the cases when UL and DL are from the same TRP and from different TRPs
      Conditions when the mechanism is particularly useful
R1-1701394 WF on SRS for UL Beam Management LG Electronics, Intel, MediaTek
Agreements:
  For NR UL, support transmissions of SRS precoded with same and different UE Tx beams within a time duration
    Detailed FFS, including the resulting overhead, time duration (e.g., one slot), and configuration, e.g., in the following:
      Different UE Tx beam: FFS per SRS resource and/or per SRS port
      Same UE Tx beam across ports: for a given SRS resource and/or a set of SRS resources
      FFS: The SRS resources can be mapped in TDM/FDM/CDM manner.
      FFS: overhead reduction schemes such as IFDMA or larger subcarrier spacing
      FFS gNB can indicate selected SRS port/resource for UE after receiving the SRS.
R1-1701506 WF on Beam Indication Samsung, Ericsson, KT Corp., Verizon, NTT DOCOMO, AT&T, LGE
Agreements:
  For reception of DL control channel, support indication of spatial QCL assumption between an DL RS antenna port(s), and DL RS antenna port(s) for demodulation of DL control channel
    FFS: signaling method
    Note: Indication may not be needed for some cases:
  For reception of DL data channel, support indication of spatial QCL assumption between DL RS antenna port(s) and DMRS antenna port(s) of DL data channel
    FFS: which DL RS(s) to use for this purpose
    Different set of DMRS antenna port(s) for the DL data channel can be indicated as QCL with different set of RS antenna port(s)
    Option 1: Information indicating the RS antenna port(s) is indicated via DCI
      FFS: whether the information indicating the RS antenna port(s) will be assumed only for the scheduled "PDSCH" or until the next indication
    Option 2: Information indicating the RS antenna port(s) is indicated via MAC-CE, and will be assumed until the next indication
    Option 3: Information indicating the RS antenna port(s) is indicated via a combination of MAC CE and DCI
    At least one option is supported
      FFS: whether to support either or both options
    FFS: whether the information indicating the RS antenna port(s) for DMRS ports for DL control channel also applies to DMRS ports for DL data channel
    Note: Indication may not be needed for some cases:
Agreements:
  NR supports a 'group common PDCCH' carrying information of e.g. the slot structure.
    If the UE does not receive the 'group common PDCCH' the UE should be able to receive at least PDCCH in a slot, at least if the gNB did not transmit the 'group common PDCCH'.
    The network will inform through RRC signalling the UE whether to decode the 'group common PDCCH' or not
    Common does not necessarily imply common per cell.
    Continue the discussion on the detailed content of the 'group common PDCCH' including usage for TDD and FDD
    The term 'group common PDCCH' refers to a channel (either a PDCCH or a separately designed channel) that carries information intended for the group of UEs.
Agreements:
  The staring position of downlink data in a slot can be explicitly and dynamically indicated to the UE.
    FFS: signaled in the UE-specific DCI and/or a 'group-common PDCCH'

FFS: how and with what granularity the unused control resource set(s) can be used for data Agreements:

The UE will have the possibility to determine whether some blind decodings can be skipped based on information on a 'group common PDCCH' (if present).

FFS: if the data starting position is signaled on the group common PDCCH, the UE may exploit this information to skip some blind decodings FFS: if the end of the control resource set is signaled on the 'group common PDCCH', the UE may exploit this information to skip some blind decodings FFS: how to handle the case when there is no 'group common PDCCH' in a slot When monitoring for a PDCCH, the UE should be able to process a detected PDCCH irrespective of whether the 'group common PDCCH' is received or not Agreements:

'Slot format related information'

Information from which the UE can derive at least which symbols in a slot that are 'DL', 'UL' (for Rel-15), and 'other', respectively FFS: if 'other' can be subdivided into 'blank', 'sidelink', etc FFS: 'Control resource set duration'

FFS: Indicates the duration of the control resource set(s)

FFS: Can help the UE skip some of the semi-statically configured blind decodings. If not received, the UE performs all blind decodings.

There are some agreements on beam management and/or group common PDCCH in RAN1 #88 meeting, as described in the Final Report of 3GPP TSG RAN WG1 #88 v1.0.0 (Athens, Greece, 13-17 Feb. 2017) as follows:

R1-1703523 WF on Framework of Beam Management Huawel, HISilicon, LG Electronics

Agreements:

A UE can be configured with the following high layer parameters for beam management:

N≥1 reporting settings, M≥1 resource settings

The links between reporting settings and resource settings are configured in the agreed CSI measurement setting CSI-RS based P-1 & P-2 are supported with resource and reporting settings P-3 can be supported with or without reporting setting A reporting setting at least including Information indicating selected beam(s)

L1 measurement reporting

FFS details (e.g., based on RSRP or CSI, etc.)

Time-domain behavior: e.g. aperiodic, periodic, semi-persistent

Frequency-granularity if multiple frequency granularities are supported

A resource setting at least including

Time-domain behavior: e.g. aperiodic, periodic, semi-persistent

RS type: NZP CSI-RS at least

At least one CSI-RS resource set, with each CSI-RS resource set having K≥1 CSI-RS resources FFS whether or not support >1 CSI-RS resource set per resource setting Some parameters of K CSI-RS resources can be the same, e.g. port number, time-domain behavior, density and periodicity if any Further discussion offline whether or not the mechanism for CSI acquisition framework can be applicable R1-1704102 Way Forward on RS Association for UL and DL Beam Management ZTE, ZTE Microelectronics, ASTRI, CMCC, Ericsson, Intel Corporation (Revision of R1-1703526)

Agreement:

FFS whether or not to support at least the following association of channel properties between UL and DL antenna ports at the same node for the case with and without beam correspondence UL SRS/DM-RS/RACH and DL CSI-RS/DM-RS/SS Details of beam related indication signaling (if any)

R1-1703730 WF on Multi-Beam Based PUCCH Transmission LG Electronics, InterDigital Agreement:

Study further multi-beam based NR-PUCCH transmission for robustness against beam pair link blocking E.g., UE transmits NR-PUCCH on different UL Tx beams in different NR-PUCCH OFDM symbols FFS: multi-beam triggering condition/mechanism (e.g. event-triggered, network configured, etc.)

FFS: number of OFDM symbols for each beam

R1-1703958 WF on beam indication Samsung, KT Corp., NTT DOCOMO, Verizon, Intel, CATT, Ericsson, Huawei, HISilicon Agreements:

For reception of unicast DL data channel, support indication of spatial CCL assumption between DL RS antenna port(s) and DMRS antenna port(s) of DL data channel: Information indicating the RS antenna port(s) is indicated via DCI (downlink grants)

The information indicates the RS antenna port(s) which is QCL-ed with DMRS antenna port(s)

FFS: Indication details

E.g. explicit indication of RS port/resource ID, or implicitly derived

FFS when the indication is applied (e.g., the indication is assumed only for the scheduled PDSCH or until next indication; when the above information is included, if there should be a scheduling/beam switch offset, etc.)

FFS: Beam indication for receiving fall back unicast PDSCH (if supported)

Note: related signalling is UE-specific

FFS: Beam indication (if needed) for receiving (UE-group) common PDSCH for RRC connected UE Candidate signalling methods for beam indication for a NR-PDCCH (i.e. configuration method to monitor NR-PDCCH)

MAC CE signalling

RRC signalling

DCI signalling

Spec-transparent and/or implicit method

Combination of the above

R1-1703558 RS for Beam Management Samsung, MediaTek, KT Corp., Noka, ASB, Verizon Agreement: For the signal(s) utilized for beam management (BM) for P1/P2/P3, study further whether it is UE-specific vs. non-UE-specific R1-1703754 WF on UE Behavior on Multi-Port SRS Transmission LG Electronics, Nokia, Alcatel-Lucent Shanghai Bell, ZTE, ZTE Microelectronics Agreement: Study further UE behavior(s) for SRS transmission and the details of the indication from gNB (if any)

Agreements:
When a UE transmits PUSCH/PUCCH or receives PDSCH based on DCI detected in group common search space, UE applies one of FFSs: default value or value provided by SIB and/or value signalled in DCI. This applies at least for following.
PDCCH to PDSCH time difference
PDCCH to PUSCH time difference
PDSCH to PUCCH time difference
FFS: timing relations during random access procedure.
In case of DCI, FFS whether some entries is modified by UE specific RRC message.
Note that this agreement does not preclude to include values provided by SIB also in UE specific RRC configuration There are some agreements on beam management and/or group common PDCCH in RAN1 #88bis meeting, as described in the Final Report of 3GPP TSG RAN WG1 #88bis v1.0.0 (Spokane, USA, 3-7 Apr. 2017) as follows:
R1-1706457 WF on Beam Measurement RS Samsung
Agreements:
For UE RRC connected mode, periodic signal is supported at least for P1 procedure (Tx/Rx beam alignment) using following options in addition to UE-specifically configured CSI-RS. Down selection from following options will be conducted in the next meeting.
Opt. 1: SS blocks
Opt. 2: Cell-specifically configured CSI-RS
Configuration of CSI-RS is obtained from the broadcast message (e.g., MIB, SIB)
Opt. 3: No additional option
R1-1706733 WF on Use of SS Blocks in Beam Management Qualcomm, LG, AT&T, Ericsson, Xinwei, Oppo, IITH, CEWiT, Tejas Networks, IITM, ZTE
Agreements:
Study whether or not support mechanism for UE to provide L1/L2 reports based on SS-block measurements for beam management
FFS which channels/signals in SS-block for measurement
Especially in light of L3-RSRP
Study further whether or not to have a unified format for L1-RSRP measurement report of SS-block and CSI-RS
R1-1706540 WF on Beam-Related Indication Ericsson, Intel, ZTE
Agreements:
Aim for low-overhead indication for spatial QCL assumption to assist UE-side beamforming/receiving
FFS details (e.g., tag-based where the tag refers to previous CSI-RS resources, BPL-based, referring to previous measurement reports, indication one resource (set) out of multiple resource (set)s configured by RRC, CSI-RS resource/port index based, etc.)
R1-1706784 WF on UL Beam Management MediaTek, Huawei, HiSilicon, InterDigital, ZTE, ZTE Microelectronics, Xinwei, Samsung, Sony, OPPO, China Telecom, Intel, Mitsubishi Electric, Ericsson, NEC, Deutsche Telekom, Fujitsu, ITRI, NTT DOCOMO, China Unicom, LG Electronics, SoftBank, KRRI
Agreements:
Confirm the WA from RAN1 AH1701 with the following update:
NR supports at least one NW-controlled mechanism for beam management for UL transmission(s)
FFS the details
R1-1706796 WF on Beam Management for UL Transmission MediaTek, Huawei, HiSilicon, InterDigital, ZTE, ZTE Microelectronics, Xinwei, Samsung, Intel, Sony, OPPO, ITRI, KRRI
Agreements:
Study whether or not the UE to provide information to gNB to assist UL beam management without UE beam correspondence
E.g., the amount of SRS resources that is needed to train UE Tx beams, based on DL beam management results if available
Study whether and how UE to use same transmission power for SRS transmission during one round of beam sweeping
E.g., derived from beam-specific power control signalling and maximum transmit power
FFS: spec. impact
R1-1706827 WF on DL Beam Indication ZTE, ZTE Microelectronics
Agreements:
For reception of DL data channel, study further at least the following:
Whether or not have an effective window of spatial QCL assumption
Interaction between higher layer signaling (if supported) and DCI indication
FFS the signaling details for higher layer and DCI based approaches (e.g., the corresponding information field in DCI, etc.)
Interaction between beam management and PDSCH transmission
Whether or not to have a default behavior (e.g., due to DCI miss detection), and if so the default behavior
Beam switching time, DCI decoding time, etc.
Agreements:
From UE signaling perspective,
The higher layer signalling for the semi-static assignment of DL/UL transmission direction for NR can achieve at least the followings
A periodicity where the configuration applies;
FFS: Detailed periodicity set;
FFS: how to achieve the signaling of periodicity
A subset of resources with fixed DL transmission;
FFS: The subset of resources can be assigned in granularity of slot and/or symbol;
A subset of resources with fixed UL transmission;
Resources with fixed UL transmission happens in the ending part of the periodicity is supported;
FFS: The subset of resources can be assigned in granularity of slot and/or symbol;
FFS: Other resources not indicated as "fixed UL" or "fixed DL" or "reserved/blank" can be considered as "flexible resource", where transmission direction can be changed dynamically.

There are some agreements on beam management and/or group common PDCCH in RAN1 #89 meeting, as described in the Final Report of 3GPP TSG RAN WG1 #89 v1.0.0 (Hangzhou, China, 15-19 May 2017) as follows:
R1-1709496 Potential Agreements on Beam Management Qualcomm
Agreements:
Support spatial QCL assumption between antenna port(s) within a CSI-RS resource(s) and antenna port of an SS Block (or SS block time index) of a cell The other QCL parameters not precluded
  FFS: indication either explicit or implicit or configurable or a default
  Note: default assumption may be no QCL
Configuration of QCL for UE specific NR-PDCCH is by RRC and MAC-CE signalling
Note that MAC-CE is not always needed
FFS: necessity of DCI signalling
Note: For example, DL RS QCLed with DMRS of PDCCH for delay spread, Doppler spread, Doppler shift, and average delay parameters, spatial parameters Agreement: Cell-specifically configured CSI-RS is not supported for beam management
R1-1709774 Potential Agreements on Beam Management Qualcomm
Agreements:
  The following beam grouping criteria are considered:
    A1 (based on Alt 1): Different TRP TX beams reported for the same group can be received simultaneously at the UE.
    A2 (based on Alt 2): Different TRP TX beams reported for different groups can be received simultaneously at the UE.
    Down selection of the beam grouping criteria by next meeting
  FFS in addition to the above grouping criteria, the following grouping criteria can be considered
    C1 (in combination with A1): Different TRP TX beams reported for different groups cannot be received simultaneously at the UE.
    C2 (in combination with A2): Different TRP TX beams reported for the same group cannot be received simultaneously at the UE.
Agreements:
  For beam management with beam group reporting the following quantities should be considered
    the max number of groups supported in the specification M,
    the max number of Tx beams per group supported in the specification N
    the number of groups to report L
    the number of Tx beams per group in the report Q
    FFS: UE-specific configuration of the parameters L, Q incorporating UE-capability information
  L=1, Q=1 are supported which implies no impact to reporting and indication overhead
  Companies are encouraged to evaluate performance to determine values of M, N, L, Q for the first release of NR
  Decide on the values of L, M, N, Q supported by the spec to be able to determine impact on reporting and indication overhead R1-1709668 WF on CSI-RS for Beam Management ZTE, LG Electronics, ASTRI, Huawel, HiSi, Samsung, Ericsson, InterDigital, CATT
Agreements:
  NR supports CSI-RS configuration to support Tx and/or Rx beam sweeping for beam management conveying at least the following information
    Information related to CSI-RS resource configuration E.g., CSI-RS RE pattern, number of CSI-RS antenna ports, CSI-RS periodicity (if applicable) etc.
    Information related to number of CSI-RS resources
    Information related to number of time-domain repetitions (if any) associated with each CSI-RS resource
      FFS: details of time-domain repetitions, e.g., signaling for time-domain repetitions may not be explicit
    FFS signaling details, e.g., explicit indication vs implicit indication
    Note this does not imply particular option (IFDMA or subcarrier scaling or DFT based) for sub time unit partition
    FFS: whether different sub-time units have same or different ports R1-1709554 WF on Aperiodic SRS for UL Beam Management OPPO, Xinwei, Xiaomi, Coolpad, Spreadtrum, Nokia, ASB, CATT, China Telecom, Intel, Samsung, MediaTek, CATR, NTT DoCoMo, Ericsson, Huawei, HISilicon
Agreements:
  For aperiodic SRS transmission triggered by single aperiodic SRS triggering field, the UE can be configured to transmit N(N>1) SRS resources for UL beam management
    FFS transmit power for the N SRS resources for UL beam management Agreements:
  The SFI transmitted in a group-common PDCCH can indicate the slot format related information for one or more slots
    The slot format related information informs the UEs of the number of slots and the slot format(s) related information of those slots
    FFS: how to interpret the SFI when the UE is configured with multiple bandwidth parts
    FFS: details for UE behaviour
  FFS: A UE may be configured to monitor for at most one group-common PDCCH carrying slot format related information (SFI) in a slot Agreements:
  Regarding to the periodicity that included in the higher layer signalling for the semi-static assignment of DL/UL transmission direction for NR, at least the following values are supported:
    [Roughly 0.125 ms, roughly 0.25 ms,] 0.5 ms, 1ms, 2 ms, 5 ms, 10 ms;
    Each periodicity is supported for particular SCS(s)/ slot duration(s)
  FFS: details Agreements:
  In 'Slot format related information', 'other' is at least: 'Unknown'
    UE shall not assume anything for the symbol with 'Unknown' by this information
    FFS: UE behavior when the UE receives the information for the symbol from SFI and broadcast DCI and/or UE-specific DCI and/or semi-static signaling/configuration
  FFS: 'Empty'
    UEs can use this resource for interference measurement
    UE may assume there is no transmission There are some agreements on beam management and/or group common PDCCH in RAN1 # AH1_NR2 meeting, as described in the Final Report of 3GPP TSG RAN WG1 # AH1_NR2 v1.0.0 (Qingdao, China, 27-30 Jun. 2017) as follows:
Agreements:
  In 'Slot format related information', 'Empty' is not indicated explicitly.

Note: RAN1 specification ensures that UE(s) is/are aware of which resources can be for 'gap for DL-UL switching' and/or 'gap'

Note: RAN1 specification ensures that UE(s) is/are aware of which resources are for 'CSI/interference measurement'.

Agreements:
  UE is configured with a CORESET to monitor group-common PDCCH.
  When configured, the group-common PDCCH follows the same CORESET configuration (e.g., REG-to-CCE mapping) of the CORESET.
    A group-common PDCCH is formed by an integer number of CCEs.
  The CORESET for the monitored group-common PDCCH carrying SFI can be the same or different from the CORESET for the monitored PDCCH for other types of control signalling.

There are some agreements on beam management and/or group common PDCCH in RAN1 # AH1_NR meeting, as described in the Final Chairman's Note of 3GPP TSG RAN WG1 Meeting #90 (Prague, Czech Republic, 21-25 Aug. 2017) as follows:

R1-1715040 WF on the use of SS-block for beam management Qualcomm, Samsung, Ericsson, ZTE, vivo, NIT Docomo, Lenovo, Motorola Mobility, LGE, Sharp, MTK, AT&T, CEWIT, IITM, Reliance Jio, IITH, BT Group, National Instruments, NEC Corp., Idaho National Labs, Vodafone, Verizon, KT, Intel, Interdigital, Oppo Agreements:
  Support L1-RSRP reporting of measurements on SS block for beam management procedures
  The following configurations for L1-RSRP reporting for beam management are supported
    SS block only (with mandatory support by UE)
    CSI-RS only (with mandatory support by UE)
    SS block+CSI-RS independent L1 RSRP reporting
      Joint L1-RSRP using QCL-ed SS-block+CSI-RS is optionally supported by UE (with optionally support by UE)

R1-1715177 WF on CSI-RS Configuration for Beam Management Ericsson, ZTE, Intel, Nokia, NSB, AT&T, Huawei, HiSilicon, CATT, Qualcomm, Sony, Mediatek, Vivo, DCM Working Assumption:
  For beam management CSI-RS, NR supports higher layer configuration of a set of single-symbol CSI-RS resources where
    The set configuration contains an information element (IE) indicating whether repetition is "on/off"
  Note: In this context, repetition "on/off" means:
    "On": The UE may assume that the gNB maintains a fixed Tx beam
    "Off": The UE can not assume that the gNB maintains a fixed Tx beam
  Note: This does NOT necessarily mean that the CSI-RS resources in a set occupy adjacent symbols R1-1713150 Discussion on UL Beam Management LG Electronics Agreements:
  Support UE to provide information to gNB to assist UL beam management
    The information can be a number representing the amount of SRS resources required for UE Tx beam training
      FFS the supported number(s), taking into account performance and implementation complexity aspects Note: these set of SRS resources are associated with a set of Tx beams
  FFS: signaling method
    E.g., capability signaling, or msg3, or dynamic signalling
  FFS: impact of multi-panel
  FFS: if to support the antenna structure with both omni-directional antenna panel and directional antenna panel, whether or not there is any additional impact Working Assumption:
  'Unknown' resource is 'flexible' and can be overridden by at least by DCI indication; 'Unknown' is used to achieve the (FFS: exactly/approximately) the same as 'Reserved' if not overridden.
    'Unknown' is signalled at least by SFI in a group-common PDCCH
    FFS: Possibility of overridden by some types of RRC (e.g., measurement configuration)
  'Reserved' resource is 'not transmit' and 'not receive' but cannot be overridden by DCI/SFI indication.
    'Reserved' is signalled at least by RRC
  FFS: handling of 'gap'
  For semi-static DL/UL transmission direction, 'Unknown' can be informed as part of the semi-static configuration.

One or multiple of following terminologies may be used hereafter:

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

Beam sweeping: In order to cover all possible directions for transmission and/or reception, a number of beams is required. Since it is not possible to generate all these beams concurrently, beam sweeping means to generate a subset of these beams in one time interval and change generated beam(s) in other time interval(s), i.e. changing beam in time domain. So, all possible directions can be covered after several time intervals.

Beam sweeping number: A necessary number of time interval(s) to sweep beams in all possible directions once for transmission and/or reception. In other words, a signaling applying beam sweeping would be transmitted "beam sweeping number" of times within one time period, e.g. the signaling is transmitted in (at least partially) different beam(s) in different times of the time period.

Serving beam: A serving beam for a UE is a beam generated by a network node, e.g. TRP, which is currently used to communicate with the UE, e.g. for transmission and/or reception.

Candidate beam: A candidate beam for a UE is a candidate of a serving beam. Serving beam may or may not be candidate beam.

Qualified beam: A qualified beam is a beam with radio quality, based on measuring signal on the beam, better than a threshold.

The best serving beam: The serving beam with the best quality (e.g. the highest BRSRP value).

The worst serving beam: The serving beam with the worst quality (e.g. the worst BRSRP value).

Figure 18:
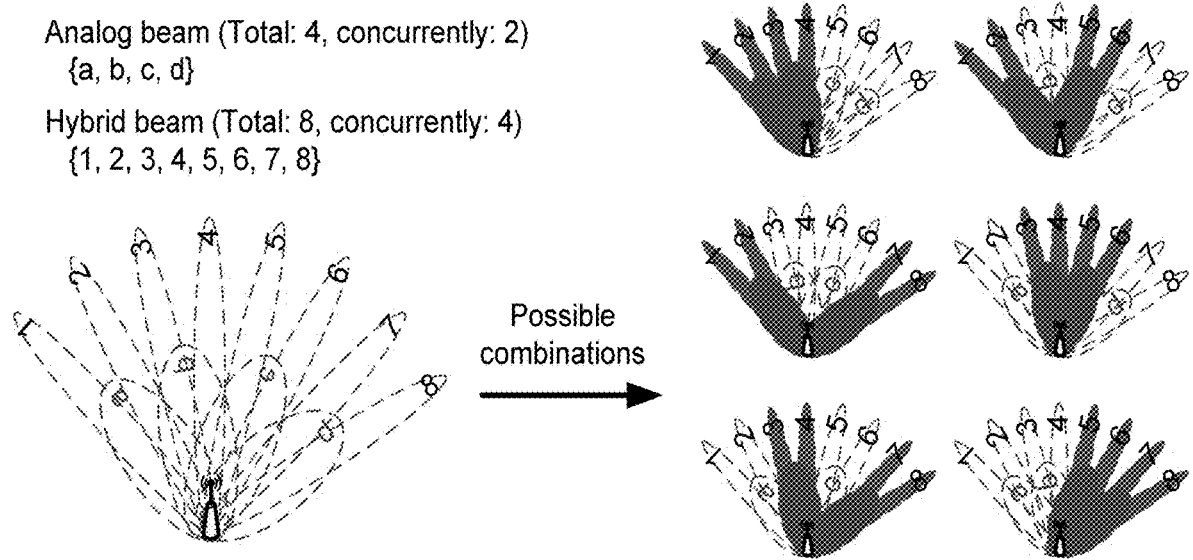
FIG. 18 shows a combination limitation of beam generation according to one exemplary embodiment.

One or multiple of following assumptions for network side may be used hereafter:

NR using beamforming could be standalone, i.e. UE can directly camp on or connect to NR.
   NR using beamforming and NR not using beamforming could coexist, e.g. in different cells.
TRP would apply beamforming to both data and control signaling transmissions and receptions, if possible and beneficial.
   Number of beams generated concurrently by TRP depends on TRP capability, e.g. maximum number of beams generated concurrently by different TRPs may be different.
   Beam sweeping is necessary, e.g. for the control signaling to be provided in every direction.
   (For hybrid beamforming) TRP may not support all beam combinations, e.g. some beams could not be generated concurrently. FIG. 18 shows an example for combination limitation of beam generation.
Downlink timing of TRPs in the same cell are synchronized.
RRC layer of network side is in BS.
TRP should support both UEs with UE beamforming and UEs without UE beamforming, e.g. due to different UE capabilities or UE releases.

One or multiple of following assumptions for UE side may be used hereafter:

UE may perform beamforming for reception and/or transmission, if possible and beneficial.
   Number of beams generated concurrently by UE depends on UE capability, e.g. generating more than one beam is possible.
   Beam(s) generated by UE is wider than beam(s) generated by TRP, gNB, or eNB.
   Beam sweeping for transmission and/or reception is generally not necessary for user data but may be necessary for other signaling, e.g. to perform measurement.
   (For hybrid beamforming) UE may not support all beam combinations, e.g. some beams could not be generated concurrently. FIG. 18 shows an example for combination limitation of beam generation.
Not every UE supports UE beamforming, e.g. due to UE capability or UE beamforming is not supported in NR first (few) release(s).
One UE is possible to generate multiple UE beams concurrently and to be served by multiple serving beams from one or multiple TRPs of the same cell.
   Same or different (DL or UL) data could be transmitted on the same radio resource via different beams for diversity or throughput gain.
There are at least two UE (RRC) states: connected state (or called active state) and non-connected state (or called inactive state or idle state). Inactive state may be an additional state or belong to connected state or non-connected state.

Figure 19:
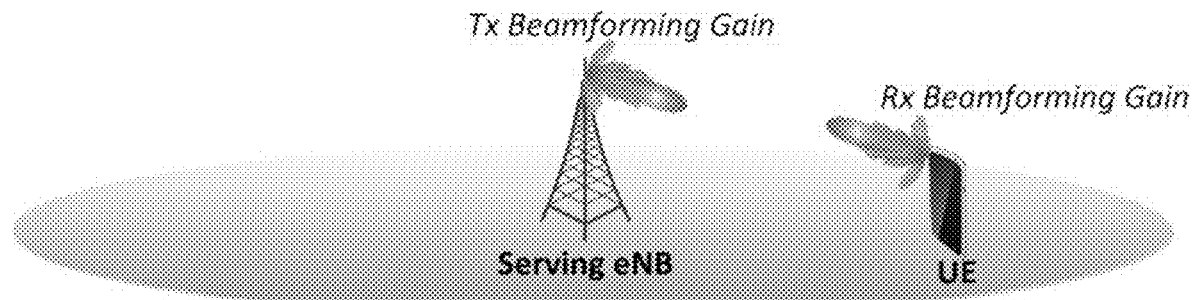
FIG. 19 is a reproduction of FIG. 3 of 3GPP R2-162251.

As discussed in 3GPP R2-162251, to use beamforming in both eNB and UE sides, practically, antenna gain by beamforming in eNB is considered about 15 to 30 dBi and the antenna gain of UE is considered about 3 to 20 dBi. FIG. 19, which is a reproduction of FIG. 3 of 3GPP R2-162251, illustrates gain compensation by beamforming.

Figure 20:
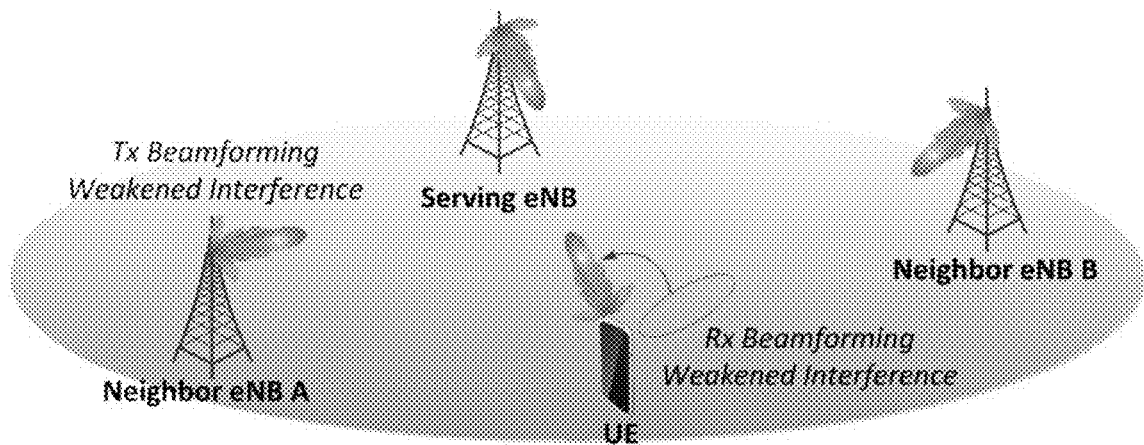
FIG. 20 is a reproduction of FIG. 4 of 3GPP R2-162251.

From the SINR (Signal to Interference-plus-Noise Ratio) perspective, sharp beamforming reduces interference power from neighbor interferers, i.e. neighbor eNBs in downlink case or other UEs connected to neighbor eNBs. In TX beamforming case, only interference from other TXs whose current beam points the same direction to the RX will be the "effective" interference. The "effective" interference means that the interference power is higher than the effective noise power. In RX beamforming case, only interference from other TXs whose beam direction is the same to the UE's current RX beam direction will be the effective interference. FIG. 20, which is a reproduction of FIG. 4 of 3GPP R2-162251, illustrates weakened interference by beamforming.

In general, LTE has been considered successful in wireless communication in recent years. However, with cellular traffic exploding, LTE implemented in unlicensed spectrum is seen as an attractive method to provide extra traffic service by operators around the world. Hence, 3GPP has worked on developing licensed-assisted access (LAA), which means traffic can be offloaded via cells in unlicensed spectrum, assisted by cells in licensed spectrum. A workable procedure for LAA DL and UL has already developed completely in LTE Release 13 and 14 respectively. In Release 15, some enhancements about LAA transmission are also in progress until now.

In NR (New Radio Access Technology), usage in unlicensed spectrum also appears attractive to communication operators due to available wider bandwidth, especially in high frequency band. However, since the power loss due to signal penetration in high frequency band is significant, the beamforming technology in transmission and reception is essential in NR communication system.

In LTE, LAA is operated in around 5 GHz band and LBT (Listen Before Talk) is essential and regulatory to implement. With LBT before transmission, the possibility of collision with other coexisting nodes, e.g. WiFi, can be effectively reduced. For NR, the unlicensed spectrum used is even higher, which is located around 60 GHz band. In such a high frequency band, LBT technology can be an option used to provide friendly coexistence with other RATs. Indeed, LBT not only can lower the interference and reduce the collision probability with other terminals contending the same channel, but also can support coexisting friendly with other LAA nodes and other RATs, such as WiFi. Although LBT is not a mandatory requirement to implement in high frequency unlicensed spectrum (e.g. 60 GHz), LBT still provides a promising opportunity to enhance the transmission reliability and lower the successful transmission latency due to collision. Hence, NR with LBT in unlicensed spectrum seems a rational implementation.

However, unlike in omni-directional transmission, transmission/reception in LTE is implemented in a directional way in high frequency band in NR. Hence, when it comes to implementing LBT in NR, the impact from beamforming is needed to be considered. In NR, a transmitting node is possible to have multiple beams in order to serve the whole coverage, wherein each beam is oriented towards different direction and may experience different channel contending condition. Bearing it in mind, LBT in NR may be implemented independently based on respective beam. For example, one TRP has four TRP beams to serve a region. One TRP beam is capable of transmitting downlink transmission if it performs LBT successfully and grabs the channel on the one TRP beam. If LBT is not performed successfully on another one TRP beam, it is not capable of transmitting downlink transmission on the another one TRP beam. Therefore, one condition which may happen is that some TRP beams pertaining to the TRP are available to transmit, and the other TRP beams are still doing back-off procedure or trying to occupy channel. Furthermore, even though there are some TRP beams occupying the channel, the ending status of channel occupation on respective TRP beam may be different, wherein the ending status of channel occupation may comprise the position of ending subframe or slot and the amount of symbols in the ending subframe or slot.

For downlink transmission in LTE LAA, if an ending subframe is located in subframe n, network needs to indicate UE in LAA cell in subframe n−1 and subframe n, which means the previous subframe and the current subframe. The indication method is through transmitting a common control signal, and the details are provided in 3GPP TS 36.213. For NR, one explicit or implicit (signaling) method may be also needed to inform UE of which subframe or slot is the last (or ending) subframe or slot within the current channel occupancy.

Figure 21:
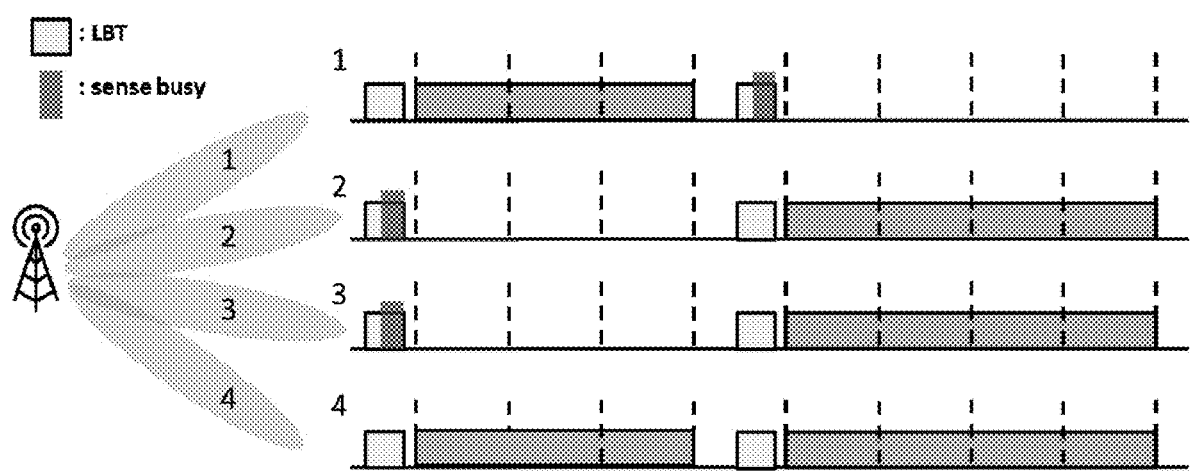
FIG. 21 is an illustration according to one exemplary embodiment.

It may be assumed that all beams using unlicensed spectrum, channel, or band belonging to a TRP may have the same occupation time. Due to beamformed transmission (in high frequency band), some TRP beams may face higher interference, and the other TRP beams may face idle channel instead. Hence, when all beams belonging to one TRP sense the channel (LBT) at the same time, some beams may fail the channel sensing (LBT) and cannot grab the channel. For example, one TRP has four TRP beams and performs the LBT on the four TRP beams at the same time. Two TRP beams succeed the channel sensing (LBT), which are notated as beam 1 and beam 4, and the other TRP beams fail the channel sensing (LBT), which are notated as beam 2 and beam 3. Moreover, it may require consideration on that one TRP may not be capable of performing transmission and reception (or sensing) at the same time even on different TRP beams. The situation can be further categorized into two cases as follows:

Case 1—The TRP can use the channels on Beam 1 and Beam 4 for a time duration. The TRP may perform next channel sensing (LBT) on Beam 2 and Beam 3 to try to obtain the channel usage after beam 1 and beam 4 end channel occupancy. An exemplary illustration is shown in FIG. 21.

Figure 22:
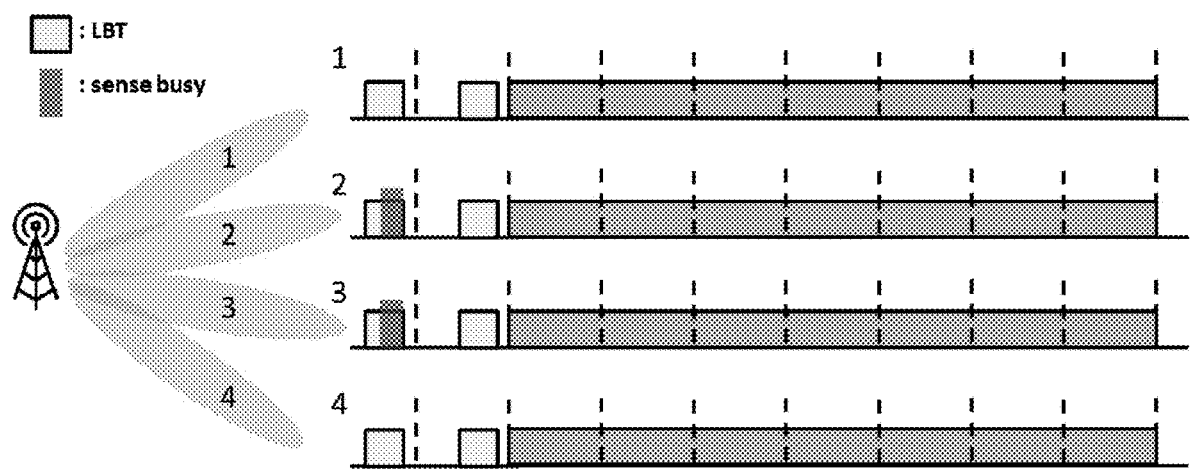
FIG. 22 is an illustration according to one exemplary embodiment.

Case 2—The TRP cannot use the channel on Beam 1 and beam 4 even the two TRP beams pass the channel sensing (LBT). All beams need to perform another LBT to grab the channel (immediately) before the next allowed transmission time instance. An exemplary illustration is shown in FIG. 22.

Regardless of which case occurs, the beam(s), which is (or are) using the unlicensed spectrum, channel, or band, should have the same occupancy time to avoid possible waste of channel utilization. Some solutions are discussed below.

Network or one TRP or gNB transmits a control signal to indicate information of ending scheduling time unit or TTI (such as ending subframe, slot, or symbol) of the TRP by the content of the control signal. A UE monitors or receives the control signal and derives information of a scheduling time unit or TTI from the control signal, wherein the information comprises transmission direction of symbol or functionality of symbol in the scheduling time unit or TTI. The UE considers the scheduling time unit or TTI as ending scheduling time unit or TTI. The UE performs DL reception or UL transmission before or within the ending scheduling time unit or TTI. In one embodiment, the UE could perform DL reception or UL transmission for a reference signal or a channel before or within the ending scheduling time unit or TTI. The UE could perform DL data reception or UL data transmission before and/or within the ending scheduling time unit or TTI until a next channel occupancy. However, the UE does not perform DL data reception or UL data transmission after the ending scheduling time unit or TTI until a next channel occupancy. In one embodiment, the next channel occupancy may be occupied or obtained by the UE or the network.

In one embodiment, the UE could monitor or receive the control signal in and unlicensed spectrum (or channel) or in an unlicensed cell (e.g. LAA cell). The transmission time(s) of the control signal is within current channel occupancy. More specifically, the ending scheduling time unit or TTI means the last scheduling time unit or TTI within the current channel occupancy. Additionally or alternatively, the ending scheduling time unit or TTI could mean the last scheduling time unit or TTI of consecutive scheduling time units or TTIs. The ending symbol means that the last symbol utilized for DL transmission or UL transmission within the ending scheduling time unit or TTI.

In one embodiment, different TRPs may transmit the control signal with different content. The ending scheduling time unit or TTI could mean the last scheduling time unit or TTI of a consecutive DL scheduling time units or TTIs or UL scheduling time units or TTIs. The control signal can be used to indicate information of any scheduling time unit or TTI of the TRP within the current channel occupancy.

In one embodiment, the control signal may be common control signal. The control signal could be transmitted by all available or occupied beams belonging to the same TRP. In particular, the control signal could be transmitted on beam(s) to explicitly or implicitly indicate the information of the ending scheduling time unit or TTI and/or ending symbol within the current channel occupancy of all available or occupied beams belonging to the TRP. The control signal could also be monitored or received and decodable by all UEs served by the beam which transmits the control signal. The beam(s) which transmit(s) the control signal could be the beam(s) that uses the unlicensed channel or unlicensed spectrum. Additionally or alternatively, the control signal could be transmitted on some of beam(s), which could be using the unlicensed channel and belong(s) to the same TRP.

In one embodiment, the control signal may not be common to the whole gNB/TRP cell. Rather, the control signal may be common control signal for a group or set of beams to the gNB or TRP cell. The UE could be configured whether to monitor/decode the control signal or not.

In one embodiment, the control signal can be a group common control signal. The control signal may carry other information in addition to information of the ending scheduling time unit or TTI and/or ending symbol of the TRP. Additionally, the control signal could include slot format related information (SFI). The control signal could also indicate the slot format related information for one or more slots. Furthermore, the control signal could indicate the UEs of the number of slots and the slot format(s) related information of those slots.

In one embodiment, the UE may monitor the control signal in licensed cell or on licensed channel. If the control signal is for a licensed cell or a licensed channel or licensed spectrum, the control signal comprises slot format related information and does not indicate ending scheduling time unit or TTI (of current channel occupancy). Alternatively or additionally, if the control signal is for an unlicensed cell or an unlicensed channel or unlicensed spectrum, the control signal comprises slot format related information and also indicates ending scheduling time unit or TTI (of current channel occupancy).

In one embodiment, the information derived from the content of the control signal could at least indicate the structure of the ending scheduling time unit or TTI. The information derived from the content of the control signal could also at least explicitly or implicitly indicate the transmission direction of symbol within the ending scheduling time unit or TTI. The transmission direction may comprise at least any of "DL", "UL", and "No DL and No UL". "DL" means DL transmission applied in the indicated symbol(s). "UL" means UL transmission applied in the indicated symbol(s). "No DL and No UL" mean no downlink transmission and no uplink transmission applied in the indicated symbol(s). Alternatively or additionally, "No DL and No UL" may mean the control signal indicates neither "DL" nor "UL" for symbol within the ending scheduling time unit or TTI. Alternatively or additionally, "No DL and No UL" may mean "empty" or "reserved".

In one embodiment, "No DL and No UL" or "empty" or "reserved" may mean that the UE does not perform transmission or reception for a reference signal or a channel in symbols indicated as "No DL and No UL" or "empty" or "reserved". Additionally, "No DL and No UL" or "empty" or "reserved" may mean that the UE does not perform transmission or reception for a reference signal with configured resources or a channel with configured resources in symbols indicated as "No DL and No UL" or "empty" or "reserved". Furthermore, "No DL and No UL" or "empty" or "reserved" may mean that the UE does not perform transmission or reception for a reference signal or a channel in symbols indicated as "No DL and No UL" or "empty" or "reserved", unless the UE receives an indication for reference signal triggering and/or data scheduling, e.g. a DCI for reference signal triggering and/or DL or UL resource assignment.

In one embodiment, "No DL and No UL" or "empty" or "reserved" may mean that the UE does not perform transmission or reception for a reference signal with configured resources or a channel with configured resources in symbols indicated as "No DL and No UL" or "empty" or "reserved", unless the UE receives an indication for reference signal triggering and/or data scheduling, e.g. a DCI for reference signal triggering and/or DL/UL resource assignment.

The way for the control signal to explicitly or implicitly indicate the timing of ending scheduling time unit or TTI and/or ending symbol can be implemented through at least two alternatives discussed below.

Alternative 1—The control signal explicitly or implicitly could indicate which one scheduling time unit or TTI in which the content of the control signal is applied. The applied scheduling time unit or TTI could be the ending scheduling time unit or TTI. Also, the applied scheduling time unit or TTI could be the ending scheduling time unit or TTI by UEs. Furthermore, the UE could assume or consider that the last symbol, which is indicated as "DL" or "UL", of the applied scheduling time unit or TTI is the ending symbol of current channel occupancy. The last symbol may be indicated as "DL" or "UL." The last symbol may not be indicated as "No DL and No UL".

In one embodiment, the control signal could indicate which one subframe or slot in which the content of the control signal is applied by a timing offset relative to the reception of the control signal. The control signal can be transmitted multiple times in different timings (e.g. different subframes or slots) within the current channel occupancy. Furthermore, the control signal can be transmitted periodically within the current channel occupancy. The information of the ending scheduling time unit or TTI indicated in these multiple or periodically transmitted control signals should be consistent and apply to the same scheduling time unit or TTI, which is the ending scheduling time unit or TTI.

In one embodiment, the network, TRP, or gNB does not indicate scheduling time unit/TTI other than the ending scheduling time unit/TTI in the control signal.

Alternative 2—The control signal could explicitly or implicitly indicate a time duration which comprises a consecutive of scheduling time units or TTIs, wherein the content of the control signal applies to these scheduling time units or TTIs. The UE could assume the last scheduling time unit or TTI in the time duration is the ending scheduling time unit or TTI. Additionally, the UE could assume or consider the last symbol indicated as "DL" or "UL" of the last scheduling time units or TTI in the time duration is the ending symbol of current channel occupancy. The last symbol may be indicated as "DL" or "UL." The last symbol may not be indicated as "No DL and No UL".

In one embodiment, the control signal can indicate the time duration by indicating starting scheduling time unit or TTI of the time duration and length of the time duration by unit of scheduling time unit or TTI. The control signal can also indicate the time duration by indicating the earliest scheduling time unit or TTI and the last scheduling time unit or TTI of the time duration.

In one embodiment, the earliest scheduling time unit or TTI can be indicated through the timing offset relative to the transmission/reception of the control signal. Alternatively, the earliest scheduling time unit or TTI could be the scheduling time unit or TTI of transmitting or receiving the control signal, or could be indicated by index of the scheduling time unit or TTI. Alternatively, the earliest scheduling time unit or TTI could be the first scheduling time unit or TTI of the current channel occupancy or the first scheduling time unit or TTI of the consecutive DL or UL scheduling time unit or TTI.

In one embodiment, the last scheduling time unit or TTI can be indicated through the timing offset relative to the reception of the control signal. Alternatively, the last scheduling time unit or TTI could be indicated by index of the scheduling time unit or TTI.

In one embodiment, the control signal can be transmitted multiple times in different timings (e.g. different subframes or slots) within the current channel occupancy. Furthermore, the control signal can be transmitted periodically within the current channel occupancy. The information of the ending scheduling time unit or TTI and/or ending symbol indicated in these multiple or periodically transmitted control signals should be consistent and imply the same last scheduling time unit or TTI with respective indicated time durations. The time duration indicated in the multiple or periodical control signals may be different.

In one embodiment, the network or TRP or gNB does not indicate and set scheduling time units or TTIs other than the ending scheduling time unit or TTI as the last scheduling time unit or TTI in the time duration indicated in the control signal.

In one embodiment, the scheduling time unit or TTI could mean a slot, a subframe, or a mini-slot.

In one embodiment, the TRP, gNB, or network could perform channel sensing (LBT) on a beam before a transmission. In particular, the TRP, gNB, or network could perform channel sensing (LBT) on a beam to assure the channel is clear, and could occupy the channel for a time duration if the channel is assured as clear.

In one embodiment, "channel occupancy" could mean a time interval within which a wireless node occupied an unlicensed channel and the wireless node is allowed to transmit in the unlicensed channel, wherein the wireless node may be a network node, or a UE node.

In one embodiment of Alternative 1, within the current channel occupancy, the network could transmit the common control signal to indicate information of a subframe or slot, which is the ending subframe. The information indicates that symbol #0 to symbol #7 are DL symbols, and the other symbols, symbol #8 to symbol #13, are No DL and No UL, assuming one subframe or slot contains 14 symbols. Then, the UE assumes the applied subframe or slot is the ending subframe or slot. The structure of the ending subframe/slot follows information in the common control signal. Symbol #0 to symbol #7 are occupied and used for DL transmission. The other symbols are unoccupied. A similar embodiment can be implemented for Alternative 2.

In one embodiment, the "subframe" or "slot" can be other scheduling time unitor TTI, such as mini-slot.

In one embodiment, the scheduling time unit or TTI indicated in the control signal may be partial. A partial scheduling time unit or TTI could mean a scheduling time unit or TTI which contains a subset of symbols within one scheduling time unit or TTI. For example, a full scheduling time unit or TTI may contain 14 symbols and a partial scheduling time unit or TTI may contain number of symbols smaller than 14.

In one embodiment, the control signals could be transmitted in different channel occupancy may carry different or the same content.

It should be noted that the disclosed solutions can be used to resolve how to indicate information of any one scheduling time unit or TTI of one beam in a TRP or cell. The disclosed solution can also be used to resolve: how to indicate information of multiple scheduling time units or TTIs of one beam in a TRP or cell.

In one embodiment, the information can be used to indicate the amount of symbols in the scheduling time unit or TTI.

In one embodiment, the beam in this invention may mean a TRP beam, and could be a TRP DL beam or a TRP UL beam.

FIG. 23 is a flow chart 2300 according to one exemplary embodiment from the perspective of a UE. In step 2305, the UE monitors or receives a control signal within a channel occupancy, wherein the control signal indicates a number of consecutive TTIs (Transmission Time Intervals) and TTI format(s) related information of the TTIs. In one embodiment, the UE could monitor or receive the control signal in unlicensed spectrum or unlicensed channel or in an unlicensed cell. The control signal could indicate transmission direction or functionality of an ending symbol, and wherein the ending symbol means the last symbol utilized or indicated for DL transmission or UL transmission within the ending TTI. Furthermore, the control signal could be a group common control signal, e.g. SFI, and wherein the control signal is transmitted multiple times in different timings within the channel occupancy. In one embodiment, if the control signal is for a licensed cell or licensed channel or licensed spectrum and comprises slot format related information, the UE does not consider the last TTI indicated in the control signal as the ending TTI of a channel occupancy; and wherein if the control signal is for an unlicensed cell or unlicensed channel or unlicensed spectrum and comprises slot format related information, the UE considers the last TTI indicated in the control signal is the ending TTI of the channel occupancy.

In step 2310, the UE derives transmission direction of symbols in the TTIs or functionality of symbols in the TTIs from the information. In one embodiment, the transmission direction or functionality of symbol could be indicated in the information comprises at least any of "DL", "UL", "No DL and No UL", "empty", or "reserved".

In step 2315, the UE considers the last TTI of the indicated TTIs as an ending TTI of the channel occupancy. In one embodiment, the ending TTI could be the last TTI within the channel occupancy, and wherein the last TTI may be a full TTI or a partial TTI that contains a subset of symbols within a full TTI.

In step 2320, the UE performs DL (Downlink) data reception or UL (Uplink) data transmission until the ending TTI. In one embodiment, the UE does not perform transmission or reception for a reference signal or a channel in symbols indicated as "No DL and No UL" or "empty" or "reserved" unless the UE receives an indication for reference signal triggering and/or data scheduling. In one embodiment, the UE could perform DL data reception or UL data transmission before and/or in an ending symbol within the ending TTI, and does not perform reception or transmission after the ending symbol, until next channel occupancy.

In one embodiment, the TTI could be a slot or a scheduling time unit.

Referring back to FIGS. 3 and 4, in one exemplary embodiment of a UE, the device 300 includes a program code 312 stored in the memory 310. The CPU 308 could execute program code 312 to enable the UE (i) to monitor or receive a control signal within a channel occupancy, wherein the control signal indicates a number of consecutive TTIs and TTI format(s) related information of the TTIs, (ii) to derive transmission direction of symbols in the TTIs or functionality of symbols in the TTIs from the information, (iii) to consider the last TTI of the indicated TTIs as an ending TTI of the channel occupancy, and (iv) to performs DL data reception or UL data transmission until the ending TTI. Furthermore, the CPU 308 can execute the program code 312 to perform all of the above-described actions and steps or others described herein.

FIG. 24 is a flow chart 2400 according to one exemplary embodiment from the perspective of a network node. In step 2405, the network node transmits a control signal within a channel occupancy, wherein the control signal indicates a number of consecutive TTIs and TTI format(s) related information of the TTIs. In one embodiment, the network node could transmit the control signal in unlicensed spectrum or unlicensed channel or in an unlicensed cell. The control signal indicates transmission direction or functionality of an ending symbol, wherein the ending symbol means the last symbol utilized or indicated for DL transmission or UL transmission within the ending TTI. The control signal could also be a group common control signal, e.g. SFI, wherein the control signal is transmitted multiple times in different timings within the channel occupancy. The TTI could be a slot or a scheduling time unit.

In step 2410, the network node indicates transmission direction of symbols in the TTIs or functionality of symbols in the TTIs via the information. In one embodiment, the transmission direction or functionality of symbol could be indicated in the information comprises at least any of "DL", "UL", "No DL and No UL", "empty", or "reserved".

In step 2415, the network node sets the last TTI of the indicated TTIs corresponds to an ending TTI of the channel occupancy.

In step 2420, the network node performs UL data reception or DL data transmission until the ending TTI. In one embodiment, the network does not perform UL reception or DL transmission for a reference signal or a channel in symbols indicated as "No DL and No UL" or "empty" or "reserved". The ending TTI could be the last TTI within a channel occupancy, and wherein the last TTI may be a partial TTI, which contains a subset of symbols within a full TTI.

In one embodiment, the network node could perform reception or transmission before and/or in an ending symbol within the ending TTI, and does not perform UL data reception or DL data transmission after the ending symbol, until next channel occupancy.

In one embodiment, if the control signal is for a licensed cell or licensed channel or licensed spectrum and comprises slot format related information, the network node does not set the last TTI indicated in the control signal corresponds to the ending TTI of the channel occupancy; and if the control signal is for an unlicensed cell or unlicensed channel or unlicensed spectrum and comprises slot format related information, the network node sets the last TTI indicated in the control signal corresponds to the ending TTI of the channel occupancy.

Referring back to FIGS. 3 and 4, in one exemplary embodiment of a network node, the device 300 includes a program code 312 stored in the memory 310. The CPU 308 could execute program code 312 to enable the network node (i) to transmit a control signal within a channel occupancy, wherein the control signal indicates a number of consecutive TTIs and TTI format(s) related information of the TTIs, (ii) to indicate transmission direction of symbols in the TTIs or functionality of symbols in the TTIs via the information, (iii) to set the last TTI of the indicated TTIs corresponds to an ending TTI of the channel occupancy, and (iv) to perform UL data reception or DL data transmission until the ending TTI. Furthermore, the CPU 308 can execute the program code 312 to perform all of the above-described actions and steps or others described herein.

Figure 25:
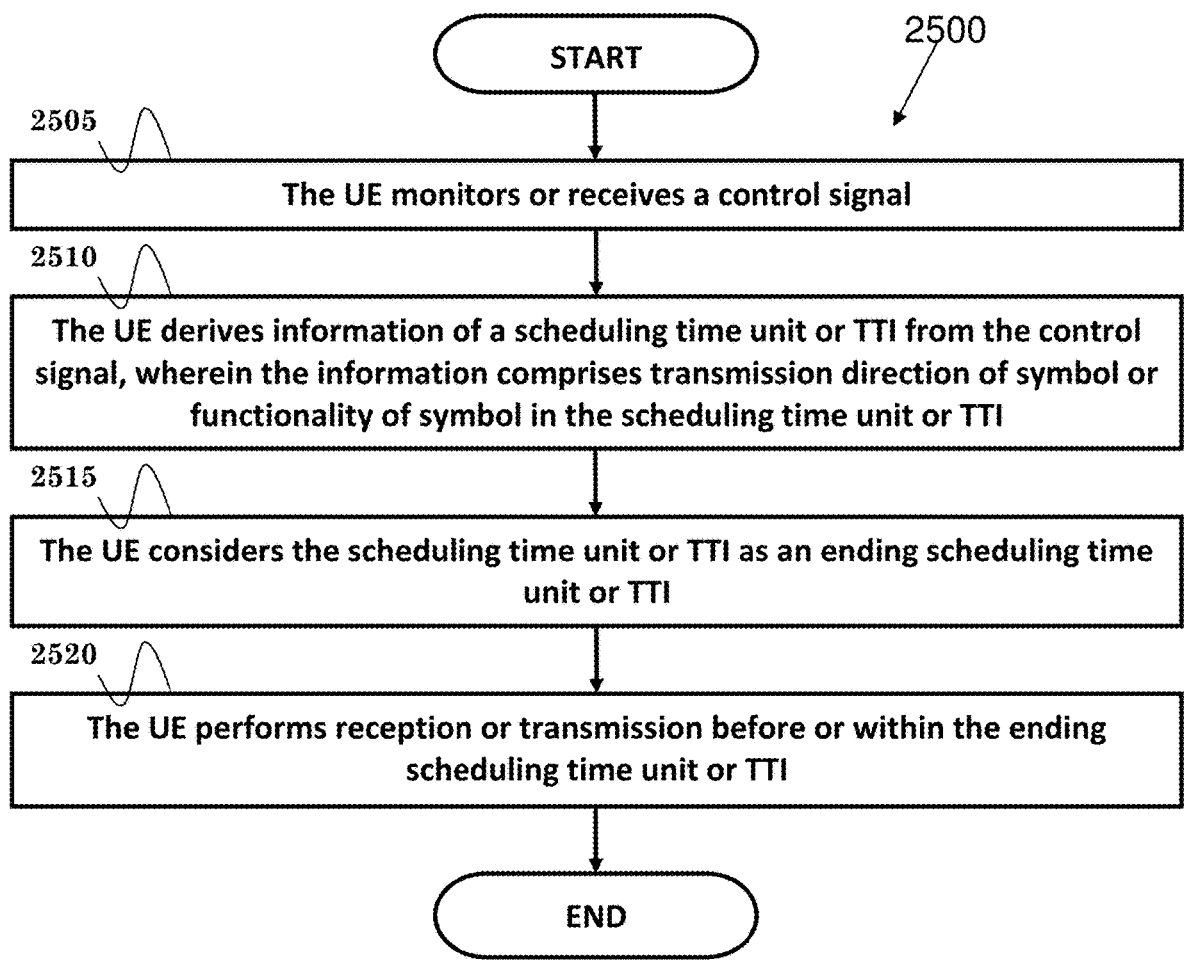
FIG. 25 is a flow chart according to one exemplary embodiment.

FIG. 25 is a flow chart 2500 according to one exemplary embodiment from the perspective of a UE. In step 2505, the UE monitors or receives a control signal. In one embodiment, the UE could monitor or receive the control signal in unlicensed spectrum/channel or in an unlicensed cell. The transmission time(s) of the control signal could be within current channel occupancy.

In one embodiment, the control signal could be common control signal. The control signal could be transmitted by all available or occupied beams belonging to the same TRP. The control signal is received and decodable by all UEs served by the same TRP transmitting the control signal. The control signal could be transmitted on some of beam(s), which is/are using the unlicensed channel and belong(s) to the same TRP.

In one embodiment, the control signal may not be common to the whole gNB or TRP cell. The control signal could be a common control signal for a group or set of beams to the gNB or TRP cell. The UE could be configured to monitor or decode the control signal or not.

In one embodiment, the control signal could be a group common control signal. Different TRPs could transmit the control signal with different content.

In one embodiment, the time duration indicated in the multiple or periodical control signals are different. The control signal does not indicate scheduling time unit or TTI other than the ending scheduling time unit or TTI as the last scheduling time unit or TTI in the time duration indicated in the control signal.

In step 2510, the UE derives information of a scheduling time unit or TTI from the control signal, wherein the information comprises transmission direction of symbol or functionality of symbol in the scheduling time unit or TTI. In one embodiment, the information derived from the control signal indicates the structure of the scheduling time unit or TTI.

In one embodiment, the transmission direction or functionality of symbol indicated in the information comprises at least any of "DL", "UL" or "No DL and No UL". "DL" could mean downlink transmission applied in the indicated symbol(s). "UL" could mean uplink transmission applied in the indicated symbol(s). "No DL and No UL" could mean no downlink transmission and no uplink transmission applied in the indicated symbol(s). Alternatively, "No DL and No UL" could mean "empty" or "reserved".

In one embodiment, the control signal could indicate which scheduling time unit or TTI where the information is applied. The control signal could also indicate which scheduling time unit or TTI where the information is applied by a timing offset relative to the reception of the control signal.

In one embodiment, the control signal could be transmitted multiple times in different timings within the current channel occupancy. The control signal could be transmitted periodically.

In one embodiment, the information derived from the multiple or periodically transmitted control signals (within the same channel occupancy) are consistent. Furthermore, the information, which is derived from the multiple or periodically transmitted control signals (within the same channel occupancy), could apply to the same scheduling time unit or TTI.

In one embodiment, the control signal does not indicate scheduling time unit/TTI other than the ending scheduling time unit or TTI. The control signal could be used to indicate information of any scheduling time units or TTIs within the current channel occupancy. Furthermore, the control signal could indicate a time duration which comprises a consecutive of scheduling time units or TTIs, wherein the content of the control signal applies to the scheduling time units or TTIs. The UE could assume the last scheduling time unit or TTI in the time duration is the ending scheduling time unit or TTI.

In one embodiment, the control signal could indicate the time duration by indicating starting scheduling time unit or TTI of the time duration and length of the time duration by unit of scheduling time unit or TTI. The control signal could also indicate the time duration by indicating the earliest scheduling time unit or TTI and the last scheduling time unit or TTI of the time duration.

In one embodiment, the earliest scheduling time unit or TTI could be indicated through the timing offset relative to the transmission or reception of the control signal. The earliest scheduling time unit or TTI could also be the scheduling time unit or TTI of transmitting or receiving the control signal. Furthermore, the earliest scheduling time unit or TTI could be indicated by index of the scheduling time unit or TTI. In addition, the earliest scheduling time unit or TTI could be the first scheduling time unit or TTI of the current channel occupancy or the first scheduling time unit or TTI of the consecutive DL or UL scheduling time unit or TTI.

In one embodiment, the control signal could be transmitted multiple times in different timings within the current channel occupancy. The control signal could be transmitted periodically.

In one embodiment, the information derived from the multiple or periodically transmitted control signals (within the same channel occupancy) are consistent. Furthermore, the information derived from the multiple or periodically transmitted control signals (within the same channel occupancy) could apply to the same one last scheduling time unit/TTI.

In step 2515, the UE considers the scheduling time unit or TTI as an ending scheduling time unit or TTI. In one embodiment, the ending scheduling time unit or TTI is the last scheduling time unit or TTI within the current channel occupancy. The ending scheduling time unit or TTI could be the last scheduling time unit or TTI of a consecutive scheduling time units or TTIs. The ending symbol within the ending scheduling time unit or TTI could be the last symbol indicated as "DL" or "UL" of the scheduling time unit or TTI.

In one embodiment, the last scheduling time unit or TTI could be indicated through the timing offset relative to the reception of the control signal. Alternatively, the last scheduling time unit or TTI could be indicated by index of the scheduling time unit or TTI.

In step 2520, the UE performs reception or transmission before or within the ending scheduling time unit or TTI. In one embodiment, the TRP, gNB, or network could perform channel sensing (LBT) on a beam before transmission. The TRP, gNB, or network could perform channel sensing (LBT) on a beam to assure the channel is clear. Furthermore, the TRP, gNB, or network could occupy the channel for a time duration if the channel is assured as clear.

In one embodiment, the control signal could include slot format related information (SFI). More specifically, the control signal could indicate the slot format related information for one or more slots. Alternatively, the control signal could indicate the UEs of the number of slots and the slot format(s) related information of those slots.

In one embodiment, the UE could monitor the control signal in a licensed cell or on a licensed channel. If the control signal is for a licensed cell or licensed channel or licensed spectrum, the control signal could include slot format related information and does not indicate ending scheduling time unit or TTI (of current channel occupancy). Alternatively, if the control signal is for an unlicensed cell or unlicensed channel or unlicensed spectrum, the control signal could include slot format related information and could also indicates ending scheduling time unit or TTI (of current channel occupancy).

In one embodiment, the scheduling time unit or TTI could mean slot, subframe, or mini-slot.

Referring back to FIGS. 3 and 4, in one exemplary embodiment of a UE, the device 300 includes a program code 312 stored in the memory 310. The CPU 308 could execute program code 312 to enable the UE (i) to monitor or receive a control signal, (ii) to derive information of a scheduling time unit or TTI from the control signal, wherein the information comprises transmission direction of symbol or functionality of symbol in the scheduling time unit or TTI, (iii) to consider the scheduling time unit or TTI as an ending scheduling time unit or TTI, or (iv) to perform reception or transmission before or within the ending scheduling time unit or TTI. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment), comprising:
   the UE monitors or receives a control signal within a channel occupancy time, wherein the control signal indicates a number of consecutive TTIs (Transmission Time Intervals) of the channel occupancy time and TTI format(s) related information of the TTIs;
   the UE derives transmission direction of each symbol in the TTIs or functionality of each symbol in the TTIs from the information of the TTIs;
   the UE considers the last TTI of the indicated TTIs as an ending TTI of the channel occupancy time; and
   the UE performs DL (Downlink) data reception or UL (Uplink) data transmission before and/or in an ending symbol in the ending TTI within the channel occupancy time, and does not perform DL data reception or UL data transmission after the ending symbol, until the next channel occupancy time.

2. The method of claim 1, wherein the UE monitors or receives the control signal in unlicensed spectrum or unlicensed channel or in an unlicensed cell.

3. The method of claim 1, wherein the transmission direction or functionality of symbol indicated in the information comprises at least any of "DL", "UL", "No DL and No UL", "empty", or "reserved".

4. The method of claim 1, wherein the UE does not perform transmission or reception for a reference signal or a channel in symbols indicated as "No DL and No UL" or "empty" or "reserved" unless the UE receives an indication for reference signal triggering and/or data scheduling.

5. The method of claim 1, wherein the ending TTI is the last TTI within the channel occupancy time, and wherein the last TTI is a full TTI or a partial TTI that contains a subset of symbols within a full TTI.

6. The method of claim 1, wherein the control signal indicates transmission direction or functionality of an ending symbol, and wherein the ending symbol means the last symbol utilized or indicated for DL transmission or UL transmission within the ending TTI.

7. The method of claim 1, wherein the control signal is a group common control signal, e.g. SFI (Slot Format Related Information), and wherein the control signal is transmitted multiple times in different timings within the channel occupancy time.

8. The method of claim 1, wherein the TTI is a slot or a scheduling time unit.

9. The method of claim 1, wherein if the control signal is for a licensed cell or licensed channel or licensed spectrum and comprises slot format related information, the UE does not consider the last TTI indicated in the control signal as the ending TTI of the channel occupancy time; and wherein if the control signal is for an unlicensed cell or unlicensed channel or unlicensed spectrum and comprises slot format related information, the UE considers the last TTI indicated in the control signal is the ending TTI of the channel occupancy time.

10. A method of a network node, comprising:
    the network node transmits a control signal within a channel occupancy time, wherein the control signal indicates a number of consecutive TTIs (Transmission Time Intervals) of the channel occupancy time and TTI format(s) related information of the TTIs;
    the network node indicates transmission direction of each symbol in the TTIs or functionality of each symbol in the TTIs via the information;
    the network node sets the last TTI of the indicated TTIs corresponds to an ending TTI of the channel occupancy time; and
    the network node performs UL (Uplink) data reception or DL (Downlink) data transmission before and/or in an ending symbol within the ending TTI, and does not perform UL data reception or DL data transmission after the ending symbol, until next channel occupancy time.

11. The method of claim 10, wherein the network node transmits the control signal in unlicensed spectrum or unlicensed channel or in an unlicensed cell.

12. The method of claim 10, wherein the transmission direction or functionality of symbol indicated in the information comprises at least any of "DL", "UL", "No DL and No UL", "empty", or "reserved".

13. The method of claim 10, wherein the network node does not perform UL reception or DL transmission for a reference signal or a channel in symbols indicated as "No DL and No UL" or "empty" or "reserved".

14. The method of claim 10, wherein the ending TTI is the last TTI within the channel occupancy time, and wherein the last TTI is a full TTI or a partial TTI, which contains a subset of symbols within a full TTI.

15. The method of claim 10, wherein the control signal indicates transmission direction or functionality of an ending symbol, wherein the ending symbol means the last symbol utilized or indicated for DL transmission or UL transmission within the ending TTI.

16. The method of claim 10, wherein the control signal is a group common control signal, e.g. SFI (Slot Format Related Information), wherein the control signal is transmitted multiple times in different timings within the channel occupancy time.

17. The method of claim 10, wherein the TTI is a slot or a scheduling time unit.

18. The method of claim 10, wherein if the control signal is for a licensed cell or licensed channel or licensed spectrum and comprises slot format related information, the network node does not set the last TTI indicated in the control signal corresponds to the ending TTI of the channel occupancy time; and wherein if the control signal is for an unlicensed cell or unlicensed channel or unlicensed spectrum and comprises slot format related information, the network node sets the last TTI indicated in the control signal corresponds to the ending TTI of the channel occupancy time.

* * * * *